United States Patent
Shimakawa

(10) Patent No.: US 9,942,278 B2
(45) Date of Patent: Apr. 10, 2018

(54) CONTROLLING COMMUNICATION BASED ON RELATIONSHIP BETWEEN A PLURALITY OF DEVICES

(71) Applicant: Sony Corporation, Tokyo (JP)

(72) Inventor: Masato Shimakawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 125 days.

(21) Appl. No.: 14/383,158

(22) PCT Filed: Jan. 25, 2013

(86) PCT No.: PCT/JP2013/000392
§ 371 (c)(1),
(2) Date: Sep. 5, 2014

(87) PCT Pub. No.: WO2013/145518
PCT Pub. Date: Oct. 3, 2013

(65) Prior Publication Data
US 2015/0026261 A1    Jan. 22, 2015

(30) Foreign Application Priority Data
Mar. 28, 2012 (JP) .................................. 2012-073375

(51) Int. Cl.
*G06F 15/177* (2006.01)
*H04L 29/06* (2006.01)
(Continued)

(52) U.S. Cl.
CPC ......... *H04L 65/1013* (2013.01); *G06Q 10/10* (2013.01); *G06Q 50/01* (2013.01); *H04L 51/32* (2013.01)

(58) Field of Classification Search
USPC ....................................................... 709/220
See application file for complete search history.

(56) References Cited

U.S. PATENT DOCUMENTS 5,440,541 A * 8/1995 Iida ..................... H04M 3/4228
370/352
6,121,881 A * 9/2000 Bieback ................. A62B 18/08
128/201.19
(Continued)

FOREIGN PATENT DOCUMENTS

JP    2009-535709 A    10/2009
JP    2009-282574 A    12/2009
(Continued)

OTHER PUBLICATIONS

U.S. Appl. No. 14/383,603, filed Sep. 8, 2014, Shimakawa.
(Continued)

*Primary Examiner* — Alicia Baturay
(74) *Attorney, Agent, or Firm* — Chip Law Group

(57) ABSTRACT

An information processing apparatus includes a communication unit, a storage unit, and a controller. The communication unit communicates with a service on a network in which a plurality of users are capable of participating and devices of the plurality of the users. The storage unit stores user information on the plurality of users and device information on the devices of the plurality of users in relation to each other. A controller controls the communication unit so that the communication obtains, from the service, social graph information, generates group information on a group consisting of a plurality of users, generates a partial network including devices of users in the group based on the generated group information, the stored user information, and the stored device information, and controls communication between the devices in the generated partial network.

14 Claims, 23 Drawing Sheets

(51) Int. Cl.
*G06Q 10/10* (2012.01)
*G06Q 50/00* (2012.01)
*H04L 12/58* (2006.01)

(56) References Cited

U.S. PATENT DOCUMENTS

| | | | | |
|---|---|---|---|---|
| 7,765,603 | B2* | 7/2010 | Tanaka | G06F 21/10 380/201 |
| 7,788,271 | B2* | 8/2010 | Soma | G06F 21/10 705/75 |
| 7,877,328 | B2* | 1/2011 | Tanaka | G06F 21/10 380/201 |
| 7,877,473 | B2* | 1/2011 | Tanaka | G06F 21/10 709/224 |
| 7,934,266 | B2* | 4/2011 | Yamauchi | G06F 21/10 705/51 |
| 8,159,940 | B1* | 4/2012 | Helmy | H04L 43/0811 370/230 |
| 8,234,310 | B2* | 7/2012 | Pottenger | G06Q 10/10 707/802 |
| 8,256,014 | B2* | 8/2012 | Kori | G06F 21/10 370/469 |
| 8,561,101 | B2* | 10/2013 | De | H04L 63/104 709/223 |
| 8,601,563 | B2* | 12/2013 | Sakai | H04L 9/0833 340/10.33 |
| 8,615,682 | B2* | 12/2013 | Yamamoto | H04L 41/044 714/32 |
| 8,725,682 | B2* | 5/2014 | Young | G06F 17/30017 707/610 |
| 8,761,814 | B2* | 6/2014 | Kim | H04W 68/025 375/260 |
| 9,104,458 | B1* | 8/2015 | Brandwine | G06F 9/45558 |
| 2003/0120801 | A1* | 6/2003 | Keever | H04L 63/0272 709/237 |
| 2004/0001087 | A1* | 1/2004 | Warmus | G06F 17/30699 715/745 |
| 2004/0234045 | A1* | 11/2004 | Hora | G06Q 10/10 379/88.13 |
| 2005/0238325 | A1* | 10/2005 | Tanabe | G06F 21/10 386/261 |
| 2005/0251690 | A1* | 11/2005 | Kuno | G06F 21/10 713/189 |
| 2006/0206484 | A1* | 9/2006 | Hara | G06F 17/30067 |
| 2007/0255831 | A1 | 11/2007 | Hayashi et al. | |
| 2007/0280210 | A1* | 12/2007 | Milstein | H04L 12/185 370/356 |
| 2008/0076396 | A1 | 3/2008 | Sotomaru et al. | |
| 2008/0167954 | A1* | 7/2008 | Kawakami | G06F 21/10 705/14.52 |
| 2008/0208973 | A1 | 8/2008 | Hayashi et al. | |
| 2010/0052864 | A1* | 3/2010 | Boyer | G08C 17/00 340/10.4 |
| 2010/0088408 | A1* | 4/2010 | Asai | G06F 11/3013 709/224 |
| 2011/0188391 | A1* | 8/2011 | Sella | H04W 24/10 370/252 |
| 2011/0258303 | A1* | 10/2011 | Nath | G06F 9/468 709/223 |
| 2012/0033623 | A1* | 2/2012 | Chu | H04W 76/02 370/329 |
| 2012/0143590 | A1 | 6/2012 | Ajima | |
| 2012/0330887 | A1* | 12/2012 | Young | G06F 17/30017 707/610 |
| 2013/0007253 | A1* | 1/2013 | Li | H04L 45/64 709/223 |

FOREIGN PATENT DOCUMENTS

| | | |
|---|---|---|
| JP | 2010-152477 A | 7/2010 |
| WO | WO 2006/043411 A1 | 4/2006 |
| WO | WO 2010/101940 A2 | 9/2010 |
| WO | WO 2010/114569 A1 | 10/2010 |
| WO | WO 2011/114634 A1 | 9/2011 |
| WO | WO 2011/138830 A1 | 11/2011 |

OTHER PUBLICATIONS

Shirakawa, Device management system using group information on SNS. IPSJ Symposium Series. 2011:1-5.

Shirakawa et al., A device management system using group information on SNS. Institute of Electronics Infor and Comm Engineers Tech Report. 2011;110:342-347.

Tanaka et al., Development of heterogeneous network device cooperating system with android terminal. Multimedia Distributed Cooperative Mobile Symposium. 2011:1256-1265.

* cited by examiner

| UserID | UserID432 |
|---|---|
| DeviceList | DevID102, DevID321, DevID654 |

FIG.8

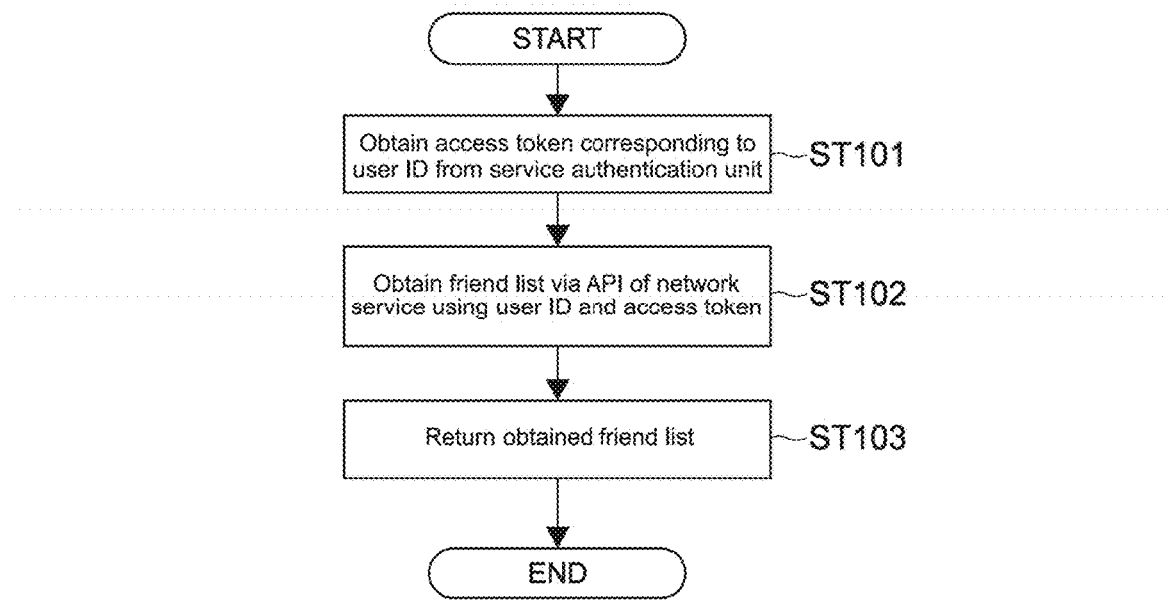
FIG.10
| Friend list | |
|---|---|
| Service | SNS_XXX |
| UserID | SNSUser102 |
| Friends | SNSUser103, SNSUser104, SNSUser321 |
FIG.11
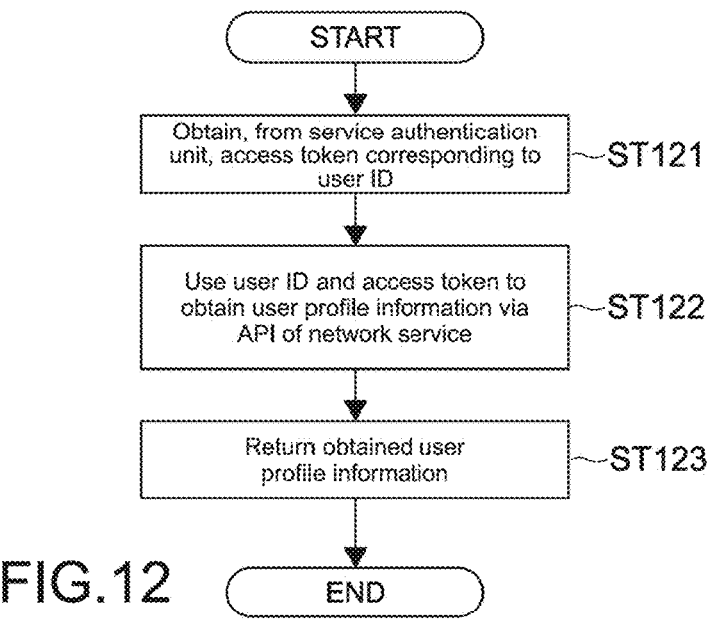
FIG.12

| User profile information | |
|---|---|
| Service | SNS_XXX |
| UserID | SNSUser102 |
| Address | Yokohama, JAPAN |
| Age | 28 |
| Hobby | programming, ski |
| Community | Fan of AKB48,○○ elementary school parent |
| ExternalSystemID | sima@xxxx.com |
| ExternalSystemID | 000012345@CloudDeviceSystem.com |

| Community participant list | |
|---|---|
| Service | SNS_XXX |
| Community | Fan of AKB48 |
| Users | SNSUser102, SNSUser104, SNSUser653 |

| ServerUserID | 000012345 |
|---|---|
| ServiceUserID1 | sima@xxx-sns.com |
| ServiceUserID2 | sima@yyy-sns.com |

FIG.16

| XXX SNS | User Profile Information |
|---|---|
| UserID | sima@xxx-sns.com |
| Addr | Yokohama, JAPAN |
| Age | 28 |
| Hobby | programming, ski |
| ... | |
| ExternalSystemID | sima@xxxx.com |
| ExternalSystemID | 000012345@CloudDeviceSystem.com |

FIG.17

| GroupID | Group123 |
|---|---|
| GroupName | Friend of SNS_XXX of SNSUser232 |
| User | User234, User432, User201 |

FIG.18

| GroupCreateInfo | Name | Condition |
|---|---|---|
| Follower(UserID, Service) | Follower of UserName ($UserID) of $Service | Service=$Service & LinkType=follower |
| Friend(UserID, Service) | Friend of $UserID.Name of $Service | Service=$Service & LinkHopCount=1 |
| FriendOfFriend(UserID, Service) | Friend of friend of $UserID.Name of $Service | Service=$Service & LinkHopCount<=2 |
| Community(Service, Community) | $Community community of $Service | Service=$Service & UserProfile.Community=$Community |

FIG.19

| GroupCreateInfo | Name | Condition |
|---|---|---|
| UserDefine | SNS_YYY Woman in AKB48 fan community | Service=SNS_YYY & UserProfile.Community=Fan of AKB48 & UserProfile.Gender=female |

| GroupID | GroupID123 |
|---|---|
| GroupName | Friend of SNS_XXX of SNSUser232 |
| User | UserID234, UserID432, UserID201 |

(B)

| UserID | UserID432 |
|---|---|
| DeviceList | DevID102, DevID321, DevID654 |

(C)

| GroupID | GroupID123 |
|---|---|
| GroupName | Friend of SNS_XXX of SNSUser232 |
| User/DeviceList | UserID234 / DevID345, DevID233, DevID092<br>UserID432 / DevID102, DevID321, DevID654<br>UserID201 / DevID755, DevID243 |

FIG.21

| srcUserID | - |
|---|---|
| srcNodeID | - |
| srcAppID | - |
| dstUserID | - |
| dstNodeID | - |
| dstAppID | - |
| serviceName | - |
| AllowOrDeny | allow / deny |

FIG.25

| srcUserID | GroupID123 | |
|---|---|---|
| srcNodeID | , | , |
| srcAppID | , | , |
| dstUserOrGroupID | , | , |
| dstNodeID | , | , |
| dstAppID | , | , |
| serviceName | system.device.DeviceDiscovery | , |
| AllowOrDeny | allow | deny |

FIG.26

| srcUserID | UserID432 |
| --- | --- |
| srcNodeID | DevID321 |
| srcAppID | AppID653 |
| dstUserID | - |
| dstNodeID | DevID232 |
| dstAppID | - |
| service | system.device.DeviceDiscovery.Subscribe |
| contextID | 3232 |

FIG.27

CONTROLLING COMMUNICATION BASED ON RELATIONSHIP BETWEEN A PLURALITY OF DEVICES

TECHNICAL FIELD

The present technology relates to an information processing apparatus capable of communicating with another information processing apparatus, an information processing system including the information processing apparatus, an information processing method for the information processing apparatus, and a program.

BACKGROUND ART

The SNS (Social Networking System) is a system in which communication can be performed with each other based on a relationship with a friend of a user, a friend of a friend, or the like. Recently, information on a relationship between users on the SNS can be obtained via a Web API (Application Programming Interface).

For example, the following Patent Document 1 describes that a network image that shows a network structure representing a relationship between users in time series is displayed based on information representing an attribution of a user who is registered in the SNS or registration time and information representing a relationship between the users on the SNS or time when the relationship is established.

CITATION LIST

Patent Document

Patent Document 1: Japanese Patent Application Laid-open No. 2009-282574

DISCLOSURE OF THE INVENTION

Problem to be Solved by the Invention

In the above-mentioned technology, however, although information representing a relationship between users on the SNS can be obtained, information on devices of the users cannot be obtained. Therefore, for example, in the case where a user allows a friend on the SNS to use his/her device mutually or a device of a friend and his/her device are allowed to cooperate with each other, the users had to perform complicated setting by themselves separately from the SNS.

In view of the circumstances as described above, the object of the present technology is to provide an information processing apparatus, an information processing system, an information processing method, and a program that are capable of allowing a plurality of users having a predetermined relationship to use their devices mutually or allowing the devices to cooperate with each other without complicated setting.

Means for Solving the Problem

In order to solve the above-mentioned problem, an information processing apparatus according to an embodiment of the present disclosure includes a communication unit, a storage unit, and a controller. The communication unit is capable of communicating with a service on a network in which a plurality of users are capable of participating and devices of the plurality of the users. The storage unit is capable of storing user information on the plurality of users and device information on the devices of the plurality of users in relation to each other. The controller is capable of controlling the communication unit so that the communication obtains, from the service, social graph information representing a relationship between the plurality of users. In addition, the controller is capable of generating group information on a group consisting of a plurality of users having the relationship based on the obtained social graph information. In addition, the controller is capable of generating a partial network including devices of users in the group based on the generated group information, the stored user information, and the stored device information. Furthermore, the controller is capable of controlling the communication unit so that the communication unit controls communication between the devices in the generated partial network.

With this configuration, the information processing apparatus generates the group information based on the social graph information on the network service, thereby allowing a plurality of users having a predetermined relationship to use their devices mutually or allowing the devices to cooperate with each other without complicated setting.

the controller may control the communication unit so that the communication unit notifies the devices in the partial network of that the partial network has been generated.

Accordingly, the user of each device in the partial network can know the fact that the partial network is generated and can perform communication based on the fact.

The controller may control the communication unit so that the communication unit transmits, to the devices in the partial network, an access-control list for rejecting access from a device of a user who does not belong to the group, based on the group information.

Accordingly, the information processing apparatus can easily cause each device in the partial network to perform the access-control process based on the group information.

The controller may cause the access-control list to include a group ID for identifying the group, and control the devices in the partial network so that the devices in the partial network reject access from a device that does not designate the group ID.

Accordingly, the information processing apparatus can easily cause each device in the partial network to perform the access-control process only by describing the group ID on the access-control list.

The controller may control the communication unit so that the communication unit receives, from a device in the partial network, a message that designates the group ID for identifying the group as a destination, and transfers the message to all devices in the partial network that are associated with the group ID.

Accordingly, by transmitting a message that designates the group ID as a destination to the information processing apparatus once, each device in the partial network can transmit the message to the devices in the partial network only.

The controller may detect generation of a predetermined event related to the device in the partial network. Furthermore, the controller may control, in the case where the generation of the event is detected, the communication unit so that the communication unit transmits event information on the event to all devices in the partial network.

Accordingly, each device in the partial network can easily know the event generated in any device in the network.

The controller may cause the event information to include a massage that is able to perform control so that an event generated in a device in the partial network is generated also in another device in the partial network.

Accordingly, the information processing apparatus can not only notify an operation or action (viewing a program, recording a program, various types of setting changes, or the like), which is performed by a user in the group, of another user, but also cause the same operation or action to be performed depending on another user's intention.

The controller may obtain presence information on the device on the partial network. Furthermore, the controller may control the communication unit so that the communication unit transmits the obtained presence information to the device in the partial network.

Accordingly, the user of each device in the partial network can easily know the presence of a user in the group, i.e., information on login/logout, suspension, continuation of no-operation state, and the like.

The controller may control the communication unit so that the communication unit receives, from a device of a user in the group, a request for generating the partial network, and generate the partial network in response to the request.

Accordingly, the user in the group can cause the information processing apparatus to generate a partial network at an arbitrary timing, and can communicate with only a device of another user in the group. For example, the user can perform streaming communication between the devices in the above-mentioned partial network.

The controller may control the communication unit so that the communication unit obtains the social graph information again based on a request from a device in the partial network or periodically, and update the group information based on the social graph that is obtained again.

Accordingly, the information processing apparatus can always generate the group information and the partial network based on the latest relationship between the users.

The device information may include a device list for each user. In this case, the controller may controls the communication unit so that the communication unit receives a request for updating the device list from a device in the partial network, and update the device list based on the request.

Accordingly, by updating the device list, the information processing apparatus can deal with a request for adding a new device to the partial network or excluding a predetermined device from the partial network, from a user in the group.

The service may manage a first user ID for a device of the user to log in the service. In this case, the controller may control the storage unit so that the storage unit stores a second user ID for the device of the user to log in the information processing apparatus in relation to the first user ID.

Accordingly, the information processing apparatus can obtain the social graph information appropriately and generate the group information and the partial network even in the case where the user ID in the service is different from the user ID for the information processing apparatus.

An information processing system according to another embodiment of the present technology includes an information processing apparatus, and a device of a user. The information processing apparatus includes a first communication unit, a storage unit, and a controller. The first communication unit is capable of communicating with the device of the user and a service on a network in which a plurality of users are capable of participating, the plurality of users including the user. The storage unit is capable of storing user information on the plurality of users and device information on the devices of the plurality of users in relation to each other. The controller is capable of controlling the communication unit so that the communication obtains, from the service, social graph information representing a relationship between the plurality of users. In addition, the controller is capable of generating group information on a group consisting of a plurality of users having the relationship based on the obtained social graph information. Furthermore, the controller is capable of generating a partial network including devices of users in the group based on the generated group information, the stored user information, and the stored device information.

The device of the user includes a second communication unit and a second controller. The second communication unit is capable of communicating with the service and the information processing apparatus. The second controller is capable of controlling the second communication unit so that the second communication unit controls communication between the devices in the generated partial network.

An information processing method according to still another embodiment of the present technology includes storing user information on the plurality of users and device information on the devices of the plurality of users in relation to each other. From a service on a network in which the plurality of users are capable of participating, social graph information representing a relationship between the plurality of users is obtained. Group information on a group consisting of a plurality of users having the relationship based on the obtained social graph information is generated. A partial network including devices of users in the group is generated based on the generated group information, the stored user information, and the stored device information. Communication between the devices in the generated partial network is controlled.

A program according still another embodiment of the present technology causes an information processing apparatus to execute the steps of a storing step, an obtaining step, a first generating step, a second generating step, and a controlling step. In the storing step, user information on the plurality of users and device information on the devices of the plurality of users are stored in relation to each other. In the obtaining step, from a service on a network in which the plurality of users are capable of participating, social graph information representing a relationship between the plurality of users is obtained. In the first generating step, group information on a group consisting of a plurality of users having the relationship is generated based on the obtained social graph information. In the second generating step, a partial network including devices of users in the group is generated based on the generated group information, the stored user information, and the stored device information. In the controlling step, communication between the devices in the generated partial network is controlled.

Effect of the Invention

As described above, according to the present technology, it is possible to allow a plurality of users having a predetermined relationship to use their devices mutually or allow the devices to cooperate with each other without complicated setting.

BRIEF DESCRIPTION OF DRAWINGS

FIG. 8 A diagram showing an example of user information that is generated and managed by the above-mentioned user authentication process.

FIG. 10 A flowchart showing a flow of a process of obtaining a friend list by the messaging server.

FIG. 11 A diagram showing an example of the above-mentioned friend list.

FIG. 12 A flowchart showing a flow of a process of obtaining user profile information by the messaging server.

FIG. 16 A diagram showing an example of correspondence information between a server user ID and a service user ID.

FIG. 17 A diagram showing another example of the correspondence information between a server user ID and a service user ID.

FIG. 18 A diagram showing an example of group information generated in the messaging server.

FIG. 19 A diagram showing an example of group information generation information that is necessary for generating the above-mentioned group information.

FIG. 20 A diagram showing another example of the group information generation information that is necessary for generating the above-mentioned group information.

FIG. 21 A diagram showing a state where a list of devices related to the group is obtained by the combination of the above-mentioned group information with the user information.

FIG. 25 A diagram showing an example of an entry format of an access-control list prepared as a default in the messaging server.

FIG. 26 A diagram showing an example of the access-control list generated in accordance with the above-mentioned entry format.

FIG. 27 A diagram showing an example of header information of a message transmitted from another device or the messaging server in the above-mentioned access-control process.

MODE(S) FOR CARRYING OUT THE INVENTION

Hereinafter, an embodiment according to the present technology will be described with reference to the drawings.

[Network Configuration of System]

Figure 1:
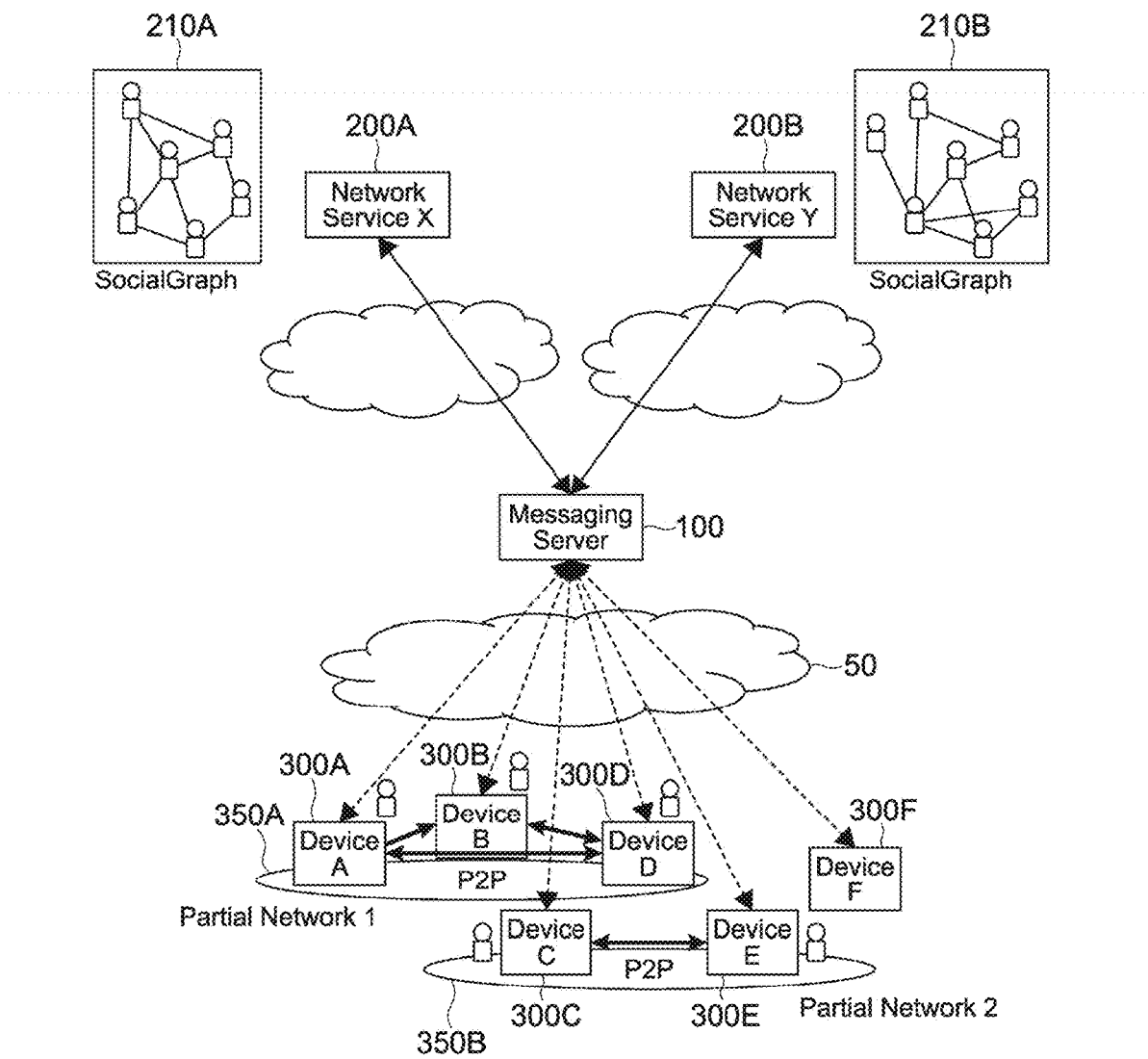
FIG. 1 A diagram showing a network configuration of a system according to an embodiment of the present technology.

FIG. 1 is a diagram showing a network configuration of a system according to this embodiment.

As shown in the figure, this system includes a messaging server 100 on a cloud, a plurality of network services 200, and a plurality of devices 300 of users. These can be communicated with each other via a WAN (Wide Area Network) 50.

The network service 200 is, for example, an SNS, establishes a social network between users who participate in (e.g., register) the service, and provides a communication service between the users. The network service 200 can communicate with the device 300 of the participating user, and stores social graph information 210 that represents a relationship (connection) between the participating users. The network service 200 can communicate also with the messaging server 100.

The messaging server 100 relays communication (message) between the devices 300. In addition, the messaging server 100 obtains, from the above-mentioned network services 200, the social graph information 210 stored in them. In addition, the messaging server 100 generates a group consisting of a plurality of users having a relationship based on the social graph information 210, and generates a partial network 350 including the plurality of devices 300 of users in the group. These generating processes of the group and the partial network 350 will be described later in detail.

Moreover, in the figure, only one messaging server 100 is shown on a cloud. However, a plurality of messaging servers 100 may be provided. In this case, a message from the device 300 can be relayed between the plurality of messaging servers 100.

That is, to each device 300, a specific messaging server 100 out of the plurality of messaging servers 100 is allocated as a using server (server in charge). The allocation method may be any one. For example, it is performed based on the ID of each device and the ID of the messaging server. In the case where a message that is transmitted from the device 300 is received by the messaging server 100 that is not in charge of the device 300, the message is transferred to another messaging server 100 in charger thereof.

The device 300 is the one owned by a user who participates in the above-mentioned network service 200. The device 300 may be any information processing apparatus such as a smartphone, a mobile phone, a tablet PC (Personal Computer), a desktop PC, a notebook PC, a PDA (Personal Digital Assistant), a portable AV player, an electronic book, a digital still camera, a camcorder, a television receiver, a PVR (Personal Video Recorder), a game device, a projector, a car navigation system, a digital photo frame, an HDD (Hard Disk Drive) apparatus, a healthcare device, and a household appliance. In the figure, 6 devices (devices 300A to device 300E) are shown as the devices 300. The number of the devices 300 may be 7 or more.

The partial network 350 is formed for the devices 300 of the plurality of users (the plurality of users who belong to the above-mentioned group) having the above-mentioned relationship by the messaging server 100. In the figure, as an example, a partial network 350A including the devices 300A, 300B, and 300D, and a partial network 350B including the devices 300C and 300E are shown.

In this case, the devices 300 can communicate with each other via the messaging server 100, and can directly communicate with each other in, for example, P2P (peer to peer) on the partial network 350.

[Hardware Configuration of Messaging Server]

Figure 2:
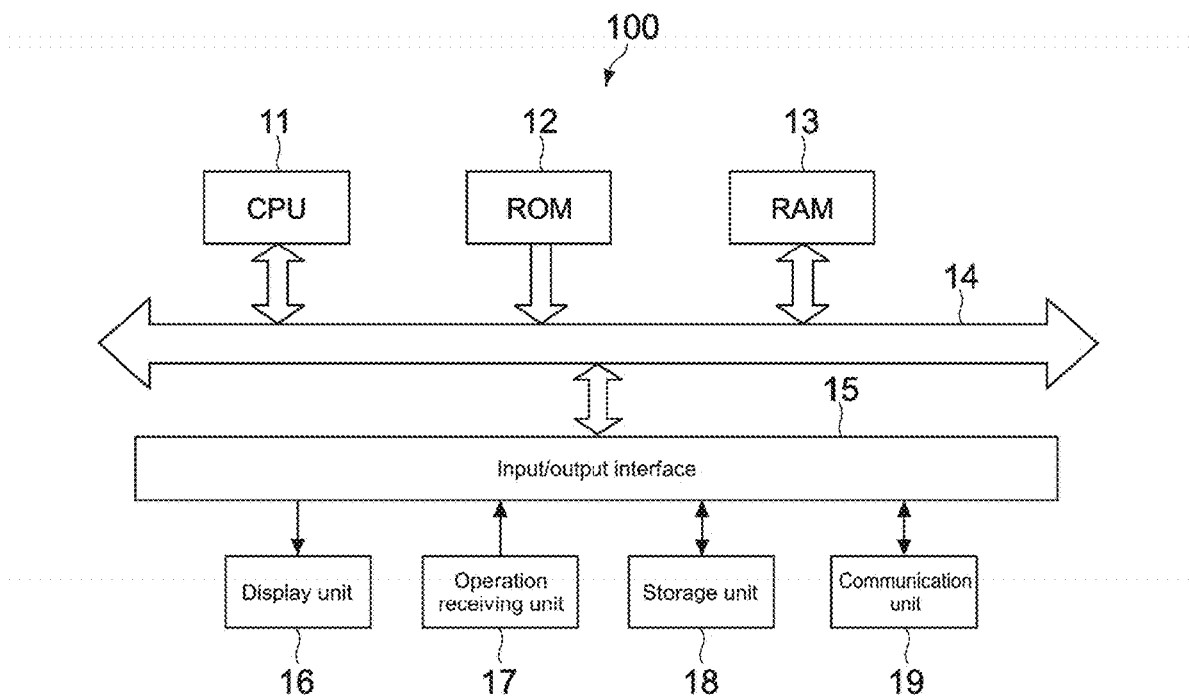
FIG. 2 A block diagram showing a hardware configuration of a messaging server in the system.

FIG. 2 is a diagram showing a hardware configuration of the above-mentioned messaging server 100. As shown in the figure, the messaging server 100 includes a CPU (Central Processing Unit) 11, a ROM (Read Only Memory) 12, a RAM (Random Access Memory) 13, an input/output interface 15, and a bus 14 connecting them with each other.

The CPU 11 appropriately access the RAM 13 as necessary and collectively controls the entire blocks of the messaging server 100 while performing various types of arithmetic processing. The ROM 12 is a non-volatile memory in which firmware such as an OS executed by the CPU 11, programs, and various parameters is fixedly stored. The RAM 13 is used as a work area for the CPU 11 and the like, and temporarily stores the OS, various applications in execution, and various types of data being processed.

To the input/output interface 15, a display unit 16, an operation receiving unit 17, a storage unit 18, a communication unit 19, and the like are connected.

The display unit 16 is a display device using an LCD (Liquid Crystal Display), an OELD (Organic ElectroLuminescence Display), or a CRT (Cathode Ray Tube), for example.

The operation receiving unit 17 is a pointing device such as a mouse, a keyboard, a touch panel, or another input apparatus. In the case where the operation receiving unit 17 is a touch panel, the touch panel may be integrated with the display unit 16.

The storage unit 18 is a nonvolatile memory such as an HDD, a flash memory (SSD; Solid State Drive), and another solid-state memory. In the storage unit 18, the OS, various applications, and various types of data are stored. In particular, in this embodiment, the storage unit 18 stores programs such as a plurality of software modules to be described later, information on the user or the device 300, the social graph information 210 obtained from the network service 200, group information on the above-mentioned group, and the like. The above-mentioned programs may be provided to the messaging server 100 via the WAN 50, or may be provided as a storage medium that can be read in the messaging server 100.

The communication unit 19 is a NIC or the like for connecting to the WAN 50 and performs the communication process between the communication unit 19 and the network service 200 or the device 300.

[Hardware Configuration of Device]

Figure 3:
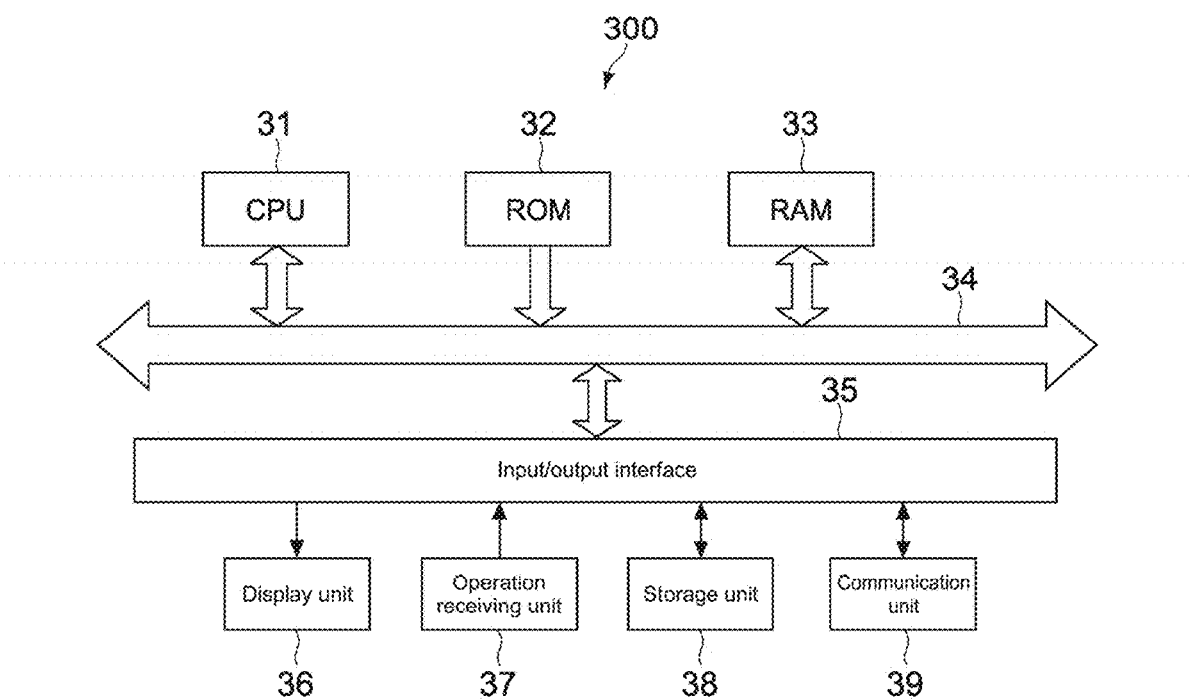
FIG. 3 A block diagram showing a hardware configuration of a device in the system.

FIG. 3 is a diagram showing a hardware configuration of the above-mentioned device 300. As shown in the figure, the hardware configuration of the device 300 is basically the same as the hardware configuration of the above-mentioned server 100. Specifically, the device 300 includes a CPU 31, a ROM 32, a RAM 33, an input/output interface 35, and a bus 34 connecting them with each other, a display unit 36, an operation receiving unit 37, a storage unit 38, and a communication unit 39. Here, the display unit 36 may be incorporated into the device 300, or may be externally connected to the device 300.

The CPU 31 controls each block such as the storage unit 38 and the communication unit 39, thereby performing a communication process with the messaging server 100 or the network service 200 or various types of data processing.

In the storage unit 38, programs such as a plurality of software modules to be described later or various databases are stored. These programs may be provided to the device 300 via the WAN 50, or may be provided as a storage medium that can be read in the device 300.

In the case where the device 300 is a mobile device such as smartphone, the communication unit 39 may be a module for wireless communication such as wireless LAN.

In the case where the device 300 is a digital photo frame or a healthcare device (e.g., clinical thermometer, weight scale, blood pressure monitor, and a pulsimeter), the operation receiving unit 37 is formed of a button or switch, and does not have a character inputting function such as a keyboard and a touch panel in some cases. Furthermore, the display unit 36 has no function of outputting UI of an application such as a browser in some cases even if a slide show of photographs or measured values can be displayed, similarly.

[Module Configuration of Messaging Server]

Figure 4:
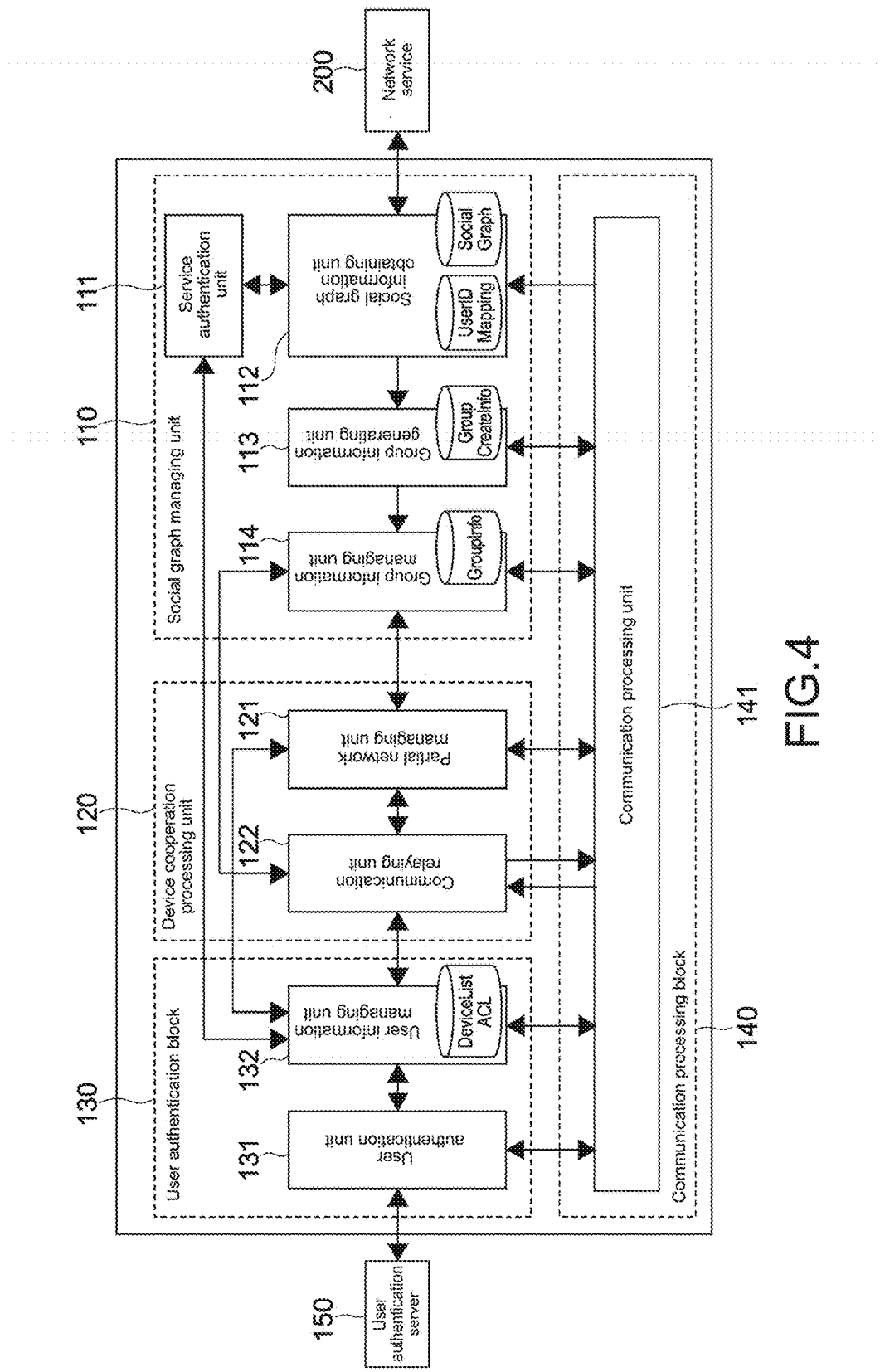
FIG. 4 A block diagram showing a software module configuration of the messaging server in the system.

FIG. 4 is a diagram showing the configuration of a software module of the above-mentioned messaging server 100. As shown in the figure, the messaging server 100 includes module blocks of a social graph managing block 110, a device cooperation processing block 120, a user authentication block 130, and a communication processing block 140.

The social graph managing block 110 collectively manages a process related to the above-mentioned social graph information 210. The social graph managing block 110 includes software modules of a service authentication unit 111, asocial graph information obtaining unit 112, a group information generating unit 113, and a group information managing unit 114.

The service authentication unit 111 performs an authentication process for obtaining the social graph information 210 related to a user from the network service 200.

The social graph information obtaining unit 112 obtains, from the network service 200, the social graph information 210 in the case where the above-mentioned authentication succeeds. In addition, in the case where the user ID on the network service 200, which is included in the social graph information 210, is different from the user ID used for communication between the messaging server 100 and the device 300, the social graph information obtaining unit 112 performs an associating process (mapping process of a user ID) of different user IDs, and stores the results.

The group information generating unit 113 generates group information on the group consisting of a plurality of users having a relationship based on the obtained social graph information 210. In addition, the group information generating unit 113 stores and manages group information generating information that is necessary for generating the group information.

The group information managing unit 114 stores and manages the above-mentioned generated group information. The group information includes a user ID for identifying the user who belongs to the group, a group ID for identifying the group, and the like.

The device cooperation processing block 120 collectively controls a cooperating process of the messaging server 100 and the devices 300 of a lot of users.

In the cooperating process of the messaging server 100 and the devices 300, each device 300 establishes an always-on connection with the messaging server 100 that is designated in advance when being activated. At this time, the device 300 notifies the messaging server 100 of a device ID that is allocated to each device 300 uniquely, and the messaging server 100 relays communication between the devices 300 based on this. The communication is performed based on a message (packet), and a destination is designated with a device ID, a user ID, or the like. Although described later, the communication between the devices 300 is performed in P2P communication if possible in order to reduce the burden on the messaging server 100.

The device cooperation processing block 120 includes software modules of a partial network managing unit 121 and a communication relaying unit 122.

The partial network managing unit 121 generates and manages information on the partial network 350 constituting of the related devices 300 from the above-mentioned group information and user information (to be described later) based on a request from the device 300.

The communication relaying unit 122 relays communication between the devices 300 connected to the messaging server 100. In this case, normally, in the case where the above-mentioned group ID for identifying the group is designated as a user ID serving as a destination of a message, the message is transmitted to the devices 300 associated with the group ID.

The user authentication block 130 collectively manages a user authentication process in the communication with the device 300. The user authentication block 130 includes software modules of a user authentication unit 131 and a user information managing unit 132.

The user authentication unit 131 uses a user authentication server 150 that is provided on a cloud separately from the messaging server 100 based on a request from the device 300 to perform a user authentication process using a user ID and password.

The user information managing unit 132 stores and manages, in a user database serving as user information, a device list that is a list of the devices 300 associated with the user ID, based on the user authentication results. In addition, the user information managing unit 132 manages an access-control list (ACL: to be described later) for each user (each user ID).

A communication processing block 140 includes a communication processing unit 141 as a software module. The communication processing unit 141 collectively controls the communication processing with the network service 200 and the device 300, which is performed by the above-mentioned social graph managing block 110, the device cooperation processing block 120, and the user authentication block 130.

[Module Configuration of Device]

Figure 5:
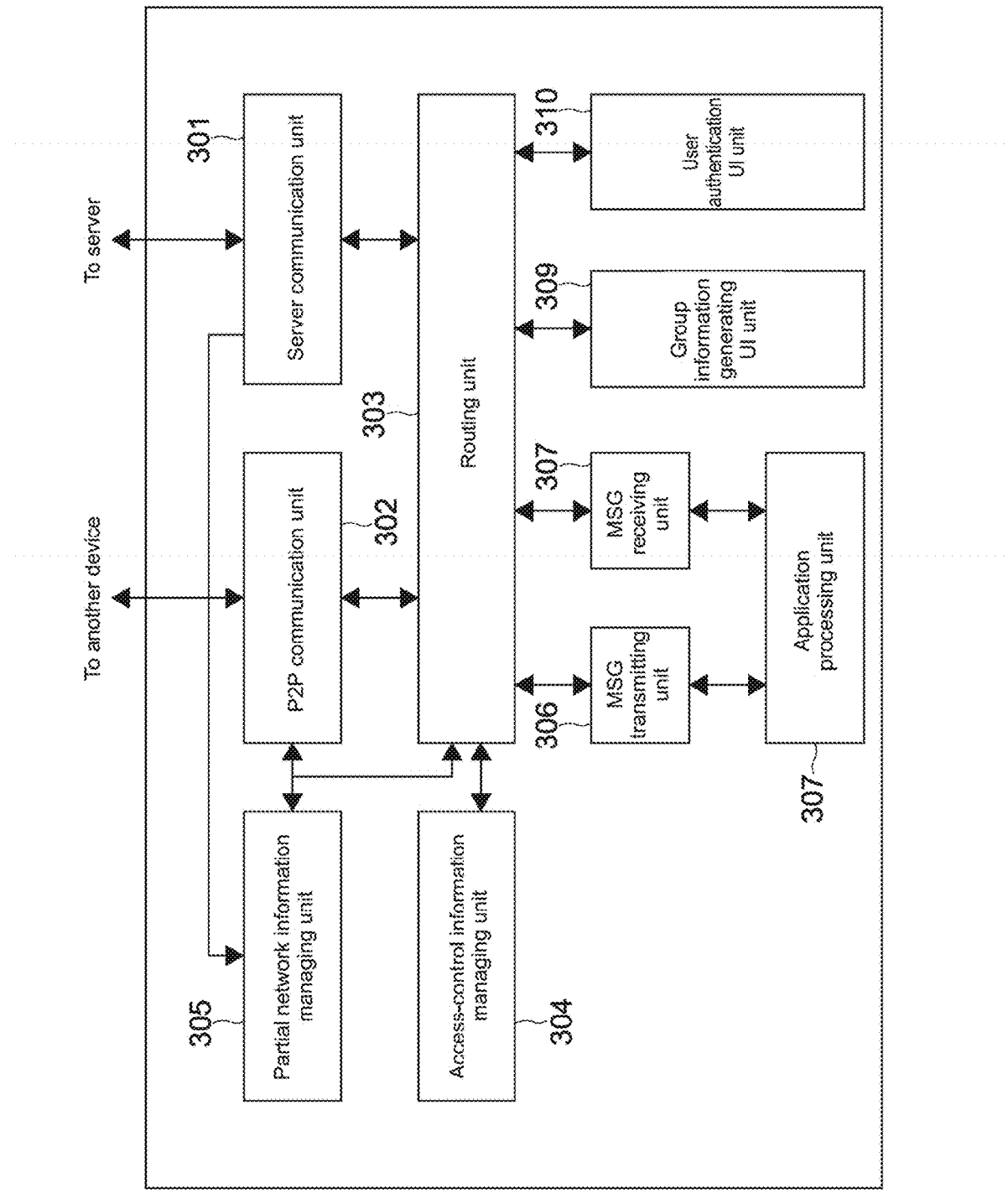
FIG. 5 A block diagram showing a software module configuration of the device in the system.

FIG. 5 is a diagram showing a configuration of a software module of the above-mentioned device 300. As shown in the figure, the device 300 includes software modules of a server communication unit 301, a P2P communication unit 302, a routing unit 303, an access-control information managing unit 304, a partial network information managing unit 305, a message transmitting unit 306, a message receiving unit 307, an application processing unit 308, a group information generating UI unit 309, and a user authentication UI unit 310.

The server communication unit 301 has a role in the communication process with the messaging server 100.

The P2P communication unit 302 has a role in the P2P communication process with another device 300.

The routing unit 303 appropriately routes a message to the server communication unit 301 and the P2P communication unit 302 depending on the destination of a message, based on the information stored by the partial network information managing unit 305. The routing unit 303 determines whether a message is accepted or not in the access-control process to be described later.

The access-control information managing unit 304 stores and manages access-control information obtained from the messaging server 100.

The partial network information managing unit 305 stores and manages partial network information obtained from the messaging server 100.

The message transmitting unit 306 transmits a message to the messaging server 100 or another device 300.

The message receiving unit 307 receives a message from the messaging server 100 or another device 300.

The application processing unit 308 passes a message, which is transmitted to the messaging server 100 or another device 300 by the application of the device 300, to the above-mentioned message transmitting unit 306. In addition, the application processing unit 308 passes a message, which is received by the message receiving unit 307 from the messaging server 100 or another device 300, to the application, and causes the application to perform a process depending on the message.

The group information generating UI unit 309 generates and controls UI displayed in the display unit 36 for a user to input group information generating information used in the group information generating process in the messaging server 100.

The user authentication UI unit 310 generates and controls the UI (e.g., input screen for user ID/password, etc.) displayed in the display unit 36 for the above-mentioned user authentication.

[Operation of System]

Next, the operation of the messaging server 100 and the device 300 in the system configured as described above will be described. In this embodiment and another embodiment, the operation of the messaging server 100 and the device 300 is performed in cooperation with the respective CPU and the above-mentioned software modules executed under control of thereof.

(User Authentication Process)

First, the user authentication process in the communication between the messaging server 100 and the device 300 will be described. The cooperation system with the messaging server 100 and the device 300 in this embodiment includes a user authentication mechanism for safely performing communication between the devices 300.

Figure 6:
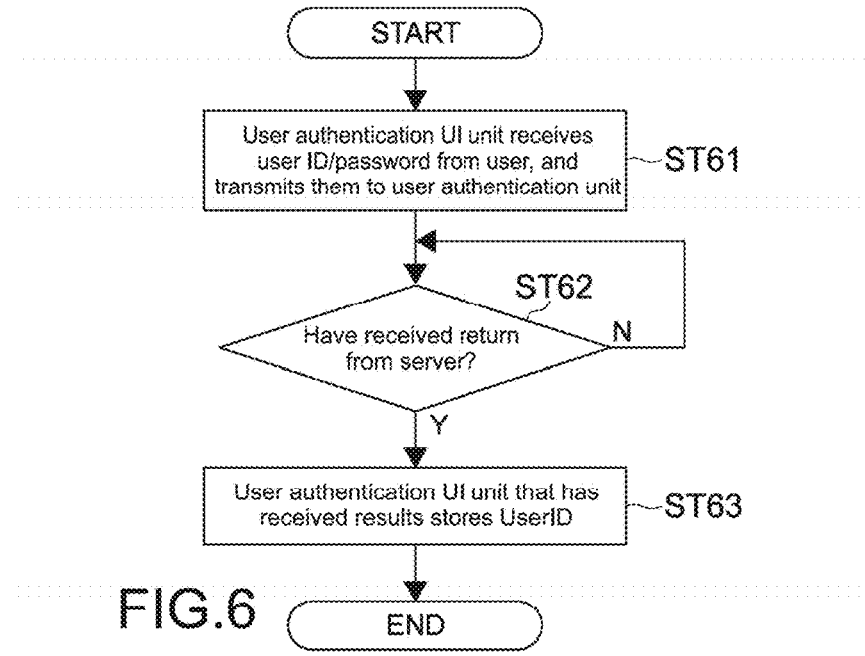
FIG. 6 A flowchart showing a flow of a user authentication process in the device.

FIG. 6 is a flowchart showing a flow of a user authentication process in the device 300. On the other hand, FIG. 7 is a flowchart showing a flow of a user authentication process in the messaging server 100.

First, the user authentication UI unit 310 of the device 300 receives an input of a user ID and password from a user on UI displayed in the display unit 36, and transmits it to the user authentication unit 131 of the messaging server 100 (Step 61 of FIG. 6). At this time, also a device ID of the device 300 is transmitted.

Figure 7:
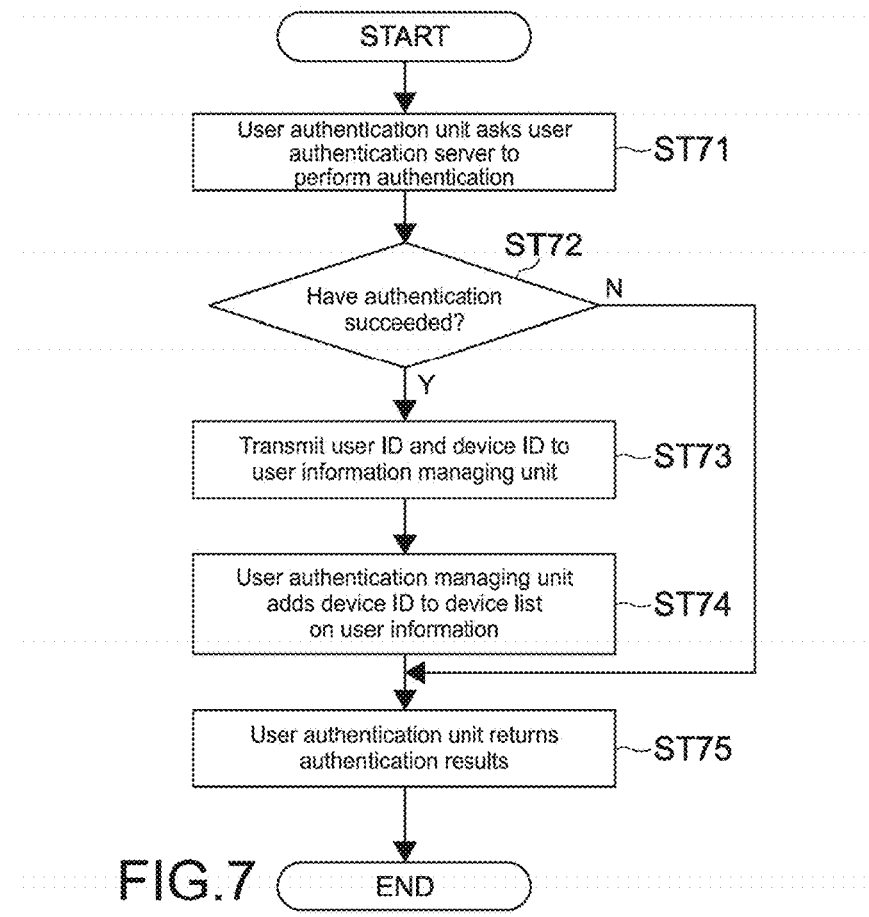
FIG. 7 A flowchart showing a flow of the user authentication process in the messaging server.

When receiving the above-mentioned user ID and password, the user authentication unit 131 of the messaging server 100 use it to ask the user authentication server 150 to perform authentication (Step 71 of FIG. 7).

In the case where authentication in the user authentication server 150 succeeds (Yes in Step 72 of FIG. 7), the user authentication unit 131 transmits the user ID and device ID to the user information managing unit 132 (Step 73 of FIG. 7).

Next, the user authentication managing unit 132 adds the above-mentioned device ID to the device list on the user information (Step 74 of FIG. 7).

Then, the user authentication unit 131 returns the above-mentioned authentication results (success/failure) to the user authentication UI unit 310 of the device 300 (Step 75 of FIG. 7).

When receiving the return of the above-mentioned authentication results (Yes in Step 62 of FIG. 6), the user authentication UI unit 310 of the device 300 stores the above-mentioned user ID (Step 63 of FIG. 6).

FIG. 8 is a diagram showing an example of user information that is generated and managed in the messaging server 100 by the above-mentioned user authentication process.

As shown in the figure, by the above-mentioned user authentication process, the user information managing unit 132 on the messaging server 100 manages a user ID and a device list associated therewith as user information. The device list includes a (or a plurality of) device ID of the device 300 associated with the user ID. The user can perform the above-mentioned user authentication process for each device 300 of himself/herself, thereby adding a device (device ID) to the device list.

(Social Graph Information Obtaining Process)

Next, the process of obtaining the above-mentioned social graph information 210 will be described.

In the case where the messaging server 100 accesses the network service 200 such as SNS to obtain the social graph information 210, the network service 200 uses an API (WebAPI or the like) provided for an external system such as the messaging server 100 in order to access information on a specific user. In order to user the API, a service authentication process is needed in some cases.

In this embodiment, the service authentication unit 111 performs authentication using an OAuth protocol used for the above-mentioned object. In the OAuth, an access token is obtained by service authentication, and this access token is used to access the network service 200 thereafter. At this time, the service authentication unit 111 obtains a user ID used for the service authentication from the user information managing unit 132.

As a method of obtaining the social graph information 210 from the network service 200, the following methods are conceivable.

A friend list is obtained from a user ID.

User profile information is obtained from a user ID. (profile information includes a participating community name list)

A community participating user list is obtained from a community name.

The social graph information obtaining unit 112 recursively combines the above-mentioned methods to obtain information sequentially.

In general, because the social graph information 210 on the network service 200 is huge, it is favorable to limit information to be obtained. For example, information that has the number of hops from a user ID designated first exceeds a value set in advance is out of being processed. The number of hops represents the number of links of a user ID that is needed to trace the social graph information 210. For example, when viewed from a user having a certain user ID, the number of hops of another user (friend) having a direct relationship with the user is 1, and the number of hops of a friend of the friend is 2.

Here, the social graph information 210 obtained by the social graph information obtaining unit 112 does not need to be stored permanently, and may be temporarily stored until it is used in the group information obtaining process performed thereafter.

Figure 9:
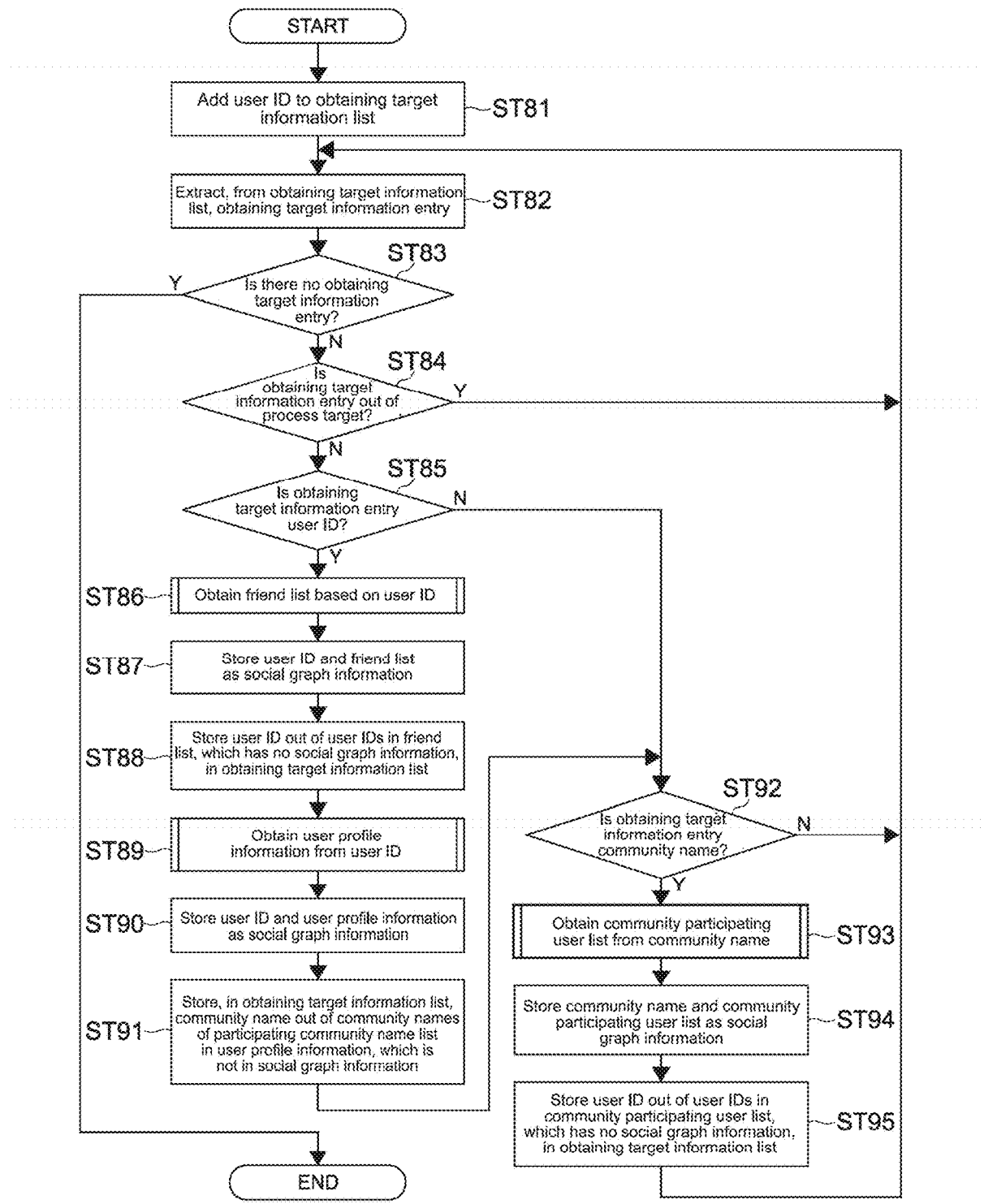
FIG. 9 A flowchart showing a flow of a social graph information obtaining process by the messaging server.

FIG. 9 is a flowchart showing a flow of a social graph information obtaining process by the messaging server 100.

As shown in the figure, the social graph information obtaining unit 112 adds a user ID to an obtaining target information list first (Step 81).

Next, the social graph information obtaining unit 112 extracts, from the above-mentioned obtaining target information list, an obtaining target information entry (Step 82). In the case where there is no entry (Yes in Step 83), the social graph information obtaining unit 112 terminates the process.

In the case where there is an entry (No in Step 83), the social graph information obtaining unit 112 determines whether the obtaining target information entry is out of a process target or not (Step 84).

In the case where the entry is out of a process target (Yes), the social graph information obtaining unit 112 returns to the above-mentioned Step 82, and extracts a new obtaining target information entry.

In the case where the obtaining target information entry is a process target (No), the social graph information obtaining unit 112 determines whether the obtaining target information entry is a user ID or not (Step 85).

In the case where it is determined that the obtaining target information entry is a user ID (Yes), the social graph information obtaining unit 112 obtains a friend list based on the user ID (Step 86).

FIG. 10 is a flowchart showing a flow of a process of obtaining the friend list.

As shown in the figure, the social graph information obtaining unit 112 obtains an access token corresponding to the user ID from the service authentication unit 111 (Step 101).

Next, the social graph information obtaining unit 112 obtains a friend list via the API of the network service 200 using the user ID and access token (Step 102).

Then, the social graph information obtaining unit 112 returns the obtained friend list as the process results (Step 103).

FIG. 11 is a diagram showing an example of the above-mentioned friend list. As shown in the figure, the friend list includes a service name, a user ID, and a list of user IDs of friends of the user corresponding to the user ID.

Return to FIG. 9. When obtaining a friend list, the social graph information obtaining unit 112 stores the user ID and the obtained friend list as a part of the above-mentioned social graph information 210 (Step 87).

Next, the social graph information obtaining unit 112 stores a user ID out of the user IDs of friends in the friend list, which has no social graph information 210 (friend list, user profile information, or community participating user list) corresponding thereto, in the obtaining target information list (Step 88).

Next, the social graph information obtaining unit 112 obtains user profile information from the above-mentioned user ID (Step 89).

FIG. 12 is a flowchart showing a flow of a process of obtaining the user profile information.

As shown in the figure, the social graph information obtaining unit 112 obtains, from the service authentication unit 111, an access token corresponding to the user ID (Step 121).

Next, the social graph information obtaining unit 112 uses the user ID and access token to obtain user profile information via the API of the network service 200 (Step 122).

Then, the social graph information obtaining unit 112 returns the obtained user profile information as the process results (Step 123).

Figures 13, 14, 15:
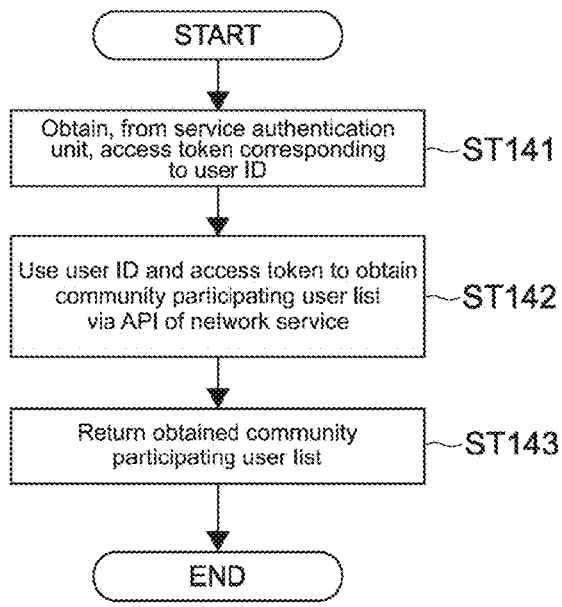
FIG. 13 A diagram showing an example of the above-mentioned user profile information.
FIG. 14 A flowchart showing a flow of a process of obtaining a community participation user list by the messaging server.
FIG. 15 A diagram showing an example of the above-mentioned community participation user list.

FIG. 13 is a diagram showing an example of the above-mentioned user profile information. As shown in the figure, the user profile information includes a service name of the network service 200, a user ID, an address, an age, a hobby, a participating community name, a user ID in an external system (e.g., the messaging server 100).

Return to FIG. 9. When obtaining user profile information, the social graph information obtaining unit 112 stores the user ID and obtained user profile information as a part of the social graph information (Step 90).

Next, the social graph information obtaining unit 112 stores a community name out of community names of the participating community name list in the user profile information in the above-mentioned obtaining target information list (Step 91). The community participating user list corresponding thereto is not in the social graph information 210.

In the case where it is determined that the obtaining target information entry is not a user ID (No) but a community name in the above-mentioned Step 85 (Yes in Step 92), the social graph information obtaining unit 112 obtains a community participating user list from the community name (Step 93).

FIG. 14 is a flowchart showing a flow of a process of obtaining the community participating user list.

As shown in the figure, the social graph information obtaining unit 112 obtains, from the service authentication unit 111, an access token corresponding to the user ID (Step 141).

Next, the social graph information obtaining unit 112 uses the user ID and access token to obtain a community participating user list via the API of the network service 200 (Step 142).

Then, the social graph information obtaining unit 112 returns the obtained community participating user list as processing results (Step 143).

FIG. 15 is a diagram showing an example of the above-mentioned community participating user list. As shown in the figure, the community participating user list includes a service name of the network service 200, a community name, and a list of user IDs of users who participate in the community.

Return to FIG. 9. When obtaining the community participating user list, the social graph information obtaining unit 112 stores the user ID and obtained community participating user list as a part of the social graph information (Step 94).

Then, the social graph information obtaining unit 112 stores a user ID out of user IDs in the community participating user list, which has no social graph information 210 (user profile information, user profile information or community participating user list) corresponding thereto, in the above-mentioned obtaining target information list (Step 95).

The social graph information obtaining unit 112 repeats the process above until all of the user IDs or community names in the obtaining target information list are processed. The process of obtaining social graph information is performed periodically or based on a request from the user of the device 300. Therefore, the social graph information 210 related to a certain user, which has been obtained once, is updated by being obtained repeatedly, and thus always reflects the latest state.

(Process of Obtaining User ID Associating Information)

Next, the process of obtaining user ID associating information will be described.

In the case where a user ID on the messaging server 100 (hereinafter, server user ID) is the same as a user ID on the network service 200 (hereinafter, service user ID), the social graph information obtained by the above-mentioned process is used as it is for the group information generating process and partial network generating process to be described later. However, it is not considered so in many cases.

In this regard, the social graph information obtaining unit 112 obtains information on association of the above-mentioned server user ID with the service user ID separately, thereby being able to use the obtained social graph information on the messaging server 100.

In order to describe the information on association of the server user ID with the service user ID, any method can be used. In this embodiment, the following two methods are used.

((Case where Messaging Server Stores Corresponding Information))

The social graph information obtaining unit 112 has a user of the device 300 input the service user ID as a part of the user information of the user of the device 300 and use it.

FIG. 16 is a diagram showing an example of the corresponding information stored in this case. As shown in the figure, on the corresponding information, the server user ID and the service user ID (or IDs) corresponding thereto are described.

((Case where Network Service Stores Corresponding Information))

The network service 200 such as SNS has a user input the server user ID as a part of the user profile information, and the social graph information obtaining unit 112 obtains and use it.

FIG. 17 is a diagram showing an example of the user profile information stored in this case. As shown in the figure, on the user profile information, the server user ID is described separately from the user ID on the network service 200 as an external system ID.

(Group Information Generating Process)

Next, the group information generating process based on the above-mentioned social graph information will be described.

The group information generating unit 113 uses group information generating information to generate group information from the social graph information 210 obtained by the social graph information obtaining unit 112 at timing of user's designation via the device 300 or at a predetermined time period.

The group information generating information is the one prepared in the messaging server 100 in advance or the one generated through a user's operation in the group information generating UI unit 309 on the device 300.

The group information generating unit 113 determines a group of users that matches conditions (has a predetermined relationship) based on the group information generating information, social graph information, and user ID correspondence information, and allocates a group ID to the group, thereby generating new group information. The generated group information is stored and managed in the group information managing unit 114.

Moreover, the group information generating unit 113 determines a group of users regarding group information that already exists similarly, and updates the group information depending thereon.

FIG. 18 is a diagram showing an example of the group information. As shown in the figure, the group information includes a group ID for identifying a group uniquely, a group name, and user names of a plurality of users who belong to the group.

FIG. 19 shows an example of the group information generating information that is prepared in the messaging server 100 in advance, and FIG. 20 shows an example of the group information generating information that is generated based on a user's input.

As shown in these figures, the group information generating information includes a connection or a community name, which is a source to generate a group, a description thereof, and information on group generating conditions.

Examples of the source to generate a group include a follower in Twitter (registered trademark), a friend, a friend of a friend, and a community.

Examples of the group generating conditions include being a follower, the number of hops being 1, the number of hops being 2 or more (friend of a friend), and belonging to a community.

(Process of Associating Group Information with User Information)

Next, the process of associating the above-mentioned group information with the user information will be described.

The user information managing unit 132 can use the group information managed in the group information managing unit 114 and the user information managed in the user information managing unit 132 in combination therewith to obtain a list of the related devices 300 (device list) from the group ID or group name.

Accordingly, in this embodiment, the messaging server 100 can use information on the relationship between the user and the device 300, which is held in the messaging server 100, and information on the relationship between users, which is held in the network service 200 such as SNS in combination therewith.

FIG. 21 is a diagram showing a state where a list of the devices 300 related to the group is obtained by the combination of the above-mentioned group information and the user information.

Specifically, by combining the group information shown in the figure (A) with the user information shown in the figure (B), a list of the devices 300 related to the group (list of the devices 300 of users who belong to the group) shown in the figure (C) is obtained. This is used for a process of generating a partial network to be described later.

(Process of Generating Partial Network)

Next, the process of generating a partial network will be described.

The device 300 designates a group ID or a group name. Accordingly, the partial network managing unit 121 of the messaging server 100 generates a partial network.

In this embodiment, the generation of a partial network represents that partial network information based on group information and user information is generated on the partial network managing unit 121.

Figure 22:
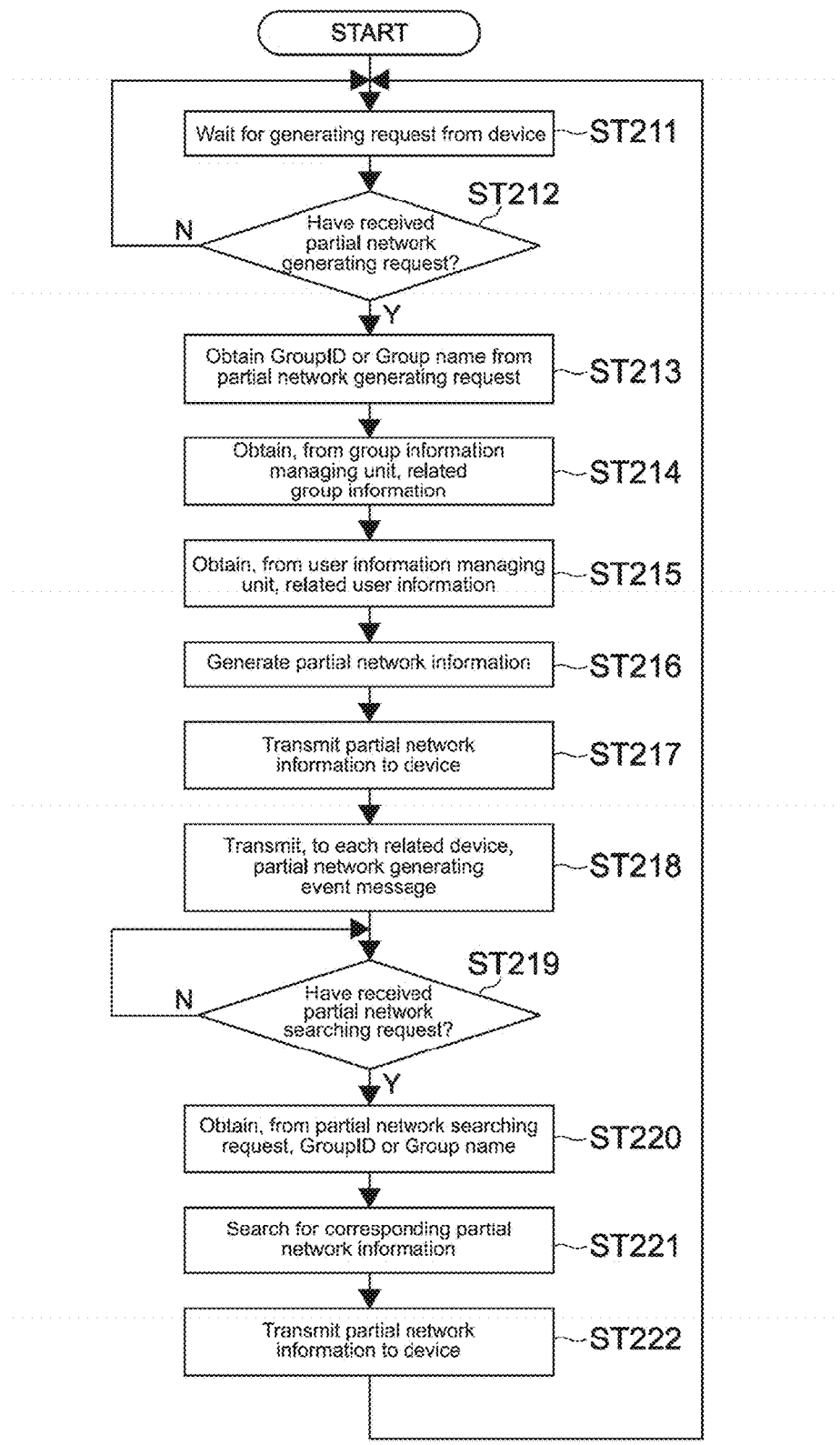
FIG. 22 A flowchart showing a flow of a partial network generating process by the messaging server.
Figure 23:
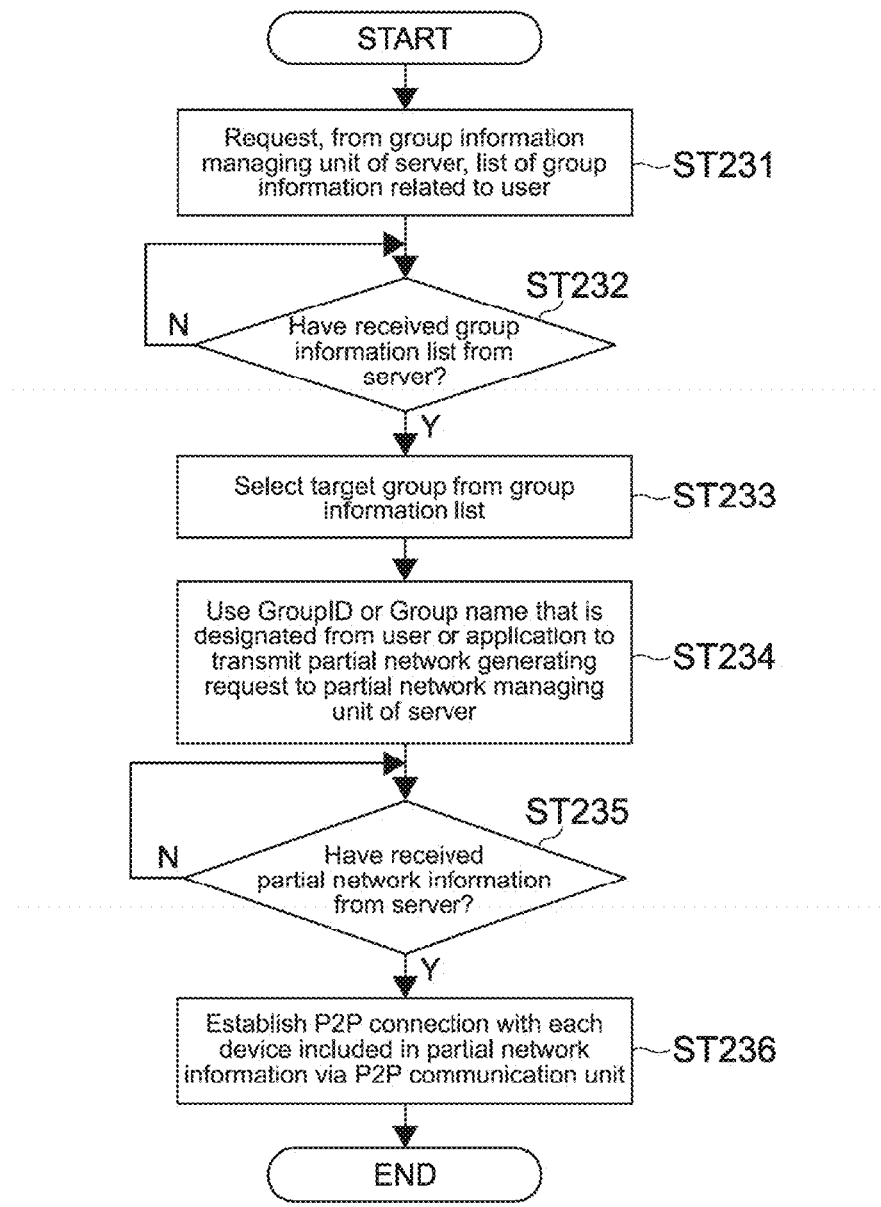
FIG. 23 A flowchart showing a flow of a partial network (new) generating process by the device.
Figure 24:
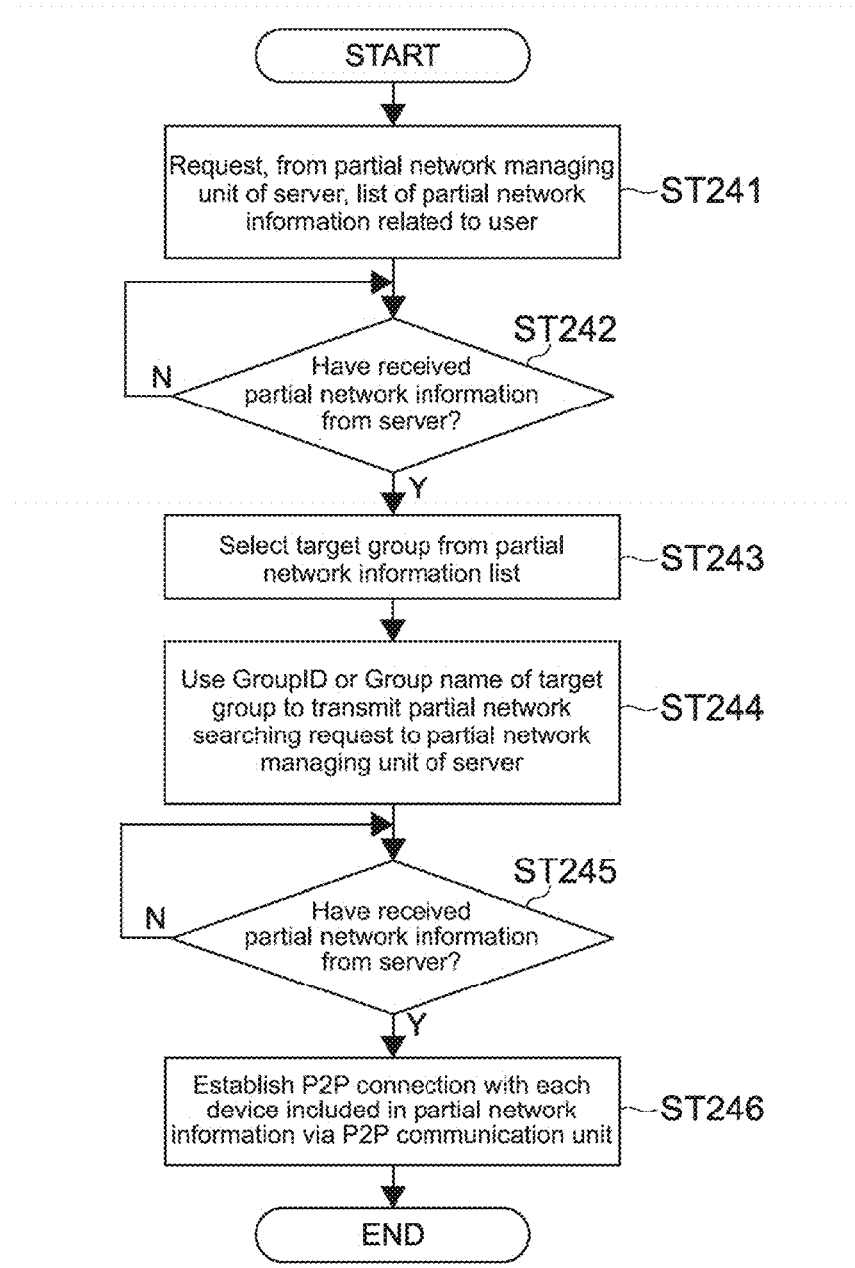
FIG. 24 A flowchart showing a flow of a partial network searching and generating process by the device.

FIG. 22 is a flowchart showing a flow of a partial network generating process by the messaging server 100. On the other hand, FIG. 23 is a flowchart showing a flow of a partial network (new) generating process by the device 300. On the other hand, FIG. 24 is a flowchart showing a flow of a partial network searching and generating process by the device 300.

First, the partial network information managing unit 305 of the device 300 requests, from the group information managing unit 114 of the messaging server 100, a list of group information on a user of the device 300 (Step 231 of FIG. 23).

Next, the partial network information managing unit 305 determines whether a group information list is received from the messaging server 100 or not (Step 232 of FIG. 23).

In the case where it is determined that a group information list is received (Yes), the partial network information managing unit 305 presents a group information list to a user, and receives an input related to selecting a group for generating a partial network (Step 233 of FIG. 23).

Next, the partial network information managing unit 305 uses a group ID or group name that is designated from a user or application to transmit a partial network generating request to the partial network managing unit 121 of the messaging server 100 (Step 234 of FIG. 23).

The partial network managing unit 121 of the messaging server 100 waits for the above-mentioned partial generating request (Step 211 of FIG. 22), and determines whether the partial network generating request is received or not (Step 212 of FIG. 22).

In the case where it is determined that the partial network generating request is received (Yes), the partial network managing unit 121 obtains a group ID or group name from the generating request (Step 213 of FIG. 22).

Next, the partial network managing unit 121 obtains, from the group information managing unit 114, group information associated with the above-mentioned group ID or group name (Step 214 of FIG. 22).

Next, the partial network managing unit 121 obtains, from the user information managing unit 132, user information associated with the above-mentioned group information (Step 215 of FIG. 22).

Next, the partial network managing unit 121 generates partial network information from the above-mentioned group information and user information (Step 216 of FIG. 22). The partial network information includes a list of users and a list of the devices 300 thereof that constitute the partial network.

Next, the partial network managing unit 121 transmits an event message representing that a partial network is generated to each device 300 related to the generated partial network (Step 217 of FIG. 22).

The above-mentioned partial network information managing unit 305 of the device 300 determines whether the above-mentioned partial network information (partial network generating event message) is received or not from the messaging server 100 (Step 235 of FIG. 23).

Then, in the case where it is determined that the above-mentioned partial network information is received (Yes), the partial network information managing unit 305 establishes a P2P connection with another device 300 included in the partial network information via the P2P communication unit 302 (Step 236 of FIG. 23).

Moreover, when starting activation, the device 300 makes an inquiry, to the partial network managing unit 121 of the messaging server 100, whether there is partial network information on itself or not, to grasp the partial network information.

That is, the partial network information managing unit 305 of the device 300 requests, from the partial network managing unit 121 of the messaging server 100, a list of partial network information on the user of the device 300 first (Step 241 of FIG. 24).

Next, the partial network information managing unit 305 determines whether a list of partial network is received from the messaging server 100 or not (Step 242 of FIG. 24).

In the case where it is determined that partial network information is received (Yes), the partial network information managing unit 305 selects a group for generating a partial network from the partial network information list (Step 243 of FIG. 24).

Next, the partial network information managing unit 305 uses the group ID or group name of the target group to transmit a partial network searching request to the partial network managing unit 121 of the messaging server 100 (Step 244 of FIG. 24).

The partial network managing unit 121 of the messaging server 100 determines whether the partial network searching request is received or not (Step 219 of FIG. 22).

Next, the partial network managing unit 121 obtains, from the searching request, a group ID or group name (Step 220 of FIG. 22).

Next, the partial network managing unit 121 searches for partial network information corresponding to the above-mentioned group ID or group name (Step 221 of FIG. 22).

Then, the partial network managing unit 121 transmits the searched partial network information to the device 300 (Step 222 of FIG. 22).

The partial network information managing unit 305 of the device 300 determines whether the above-mentioned partial network information is received or not from the messaging server 100 (Step 245 of FIG. 24).

In the case where it is determined that partial network information is received (Yes), the partial network information managing unit 305 establishes a P2P connection with another device 300 included in the partial network information via the P2P communication unit 302 (Step 246 of FIG. 24).

(Communication Controlling Process Using Partial Network)

Next, the communication controlling process using the partial network generated as described above will be described.

((Use for Access Control))

First, the access-control process using the partial network will be described. In this embodiment, each user can control the access to various functions on the device 300 of himself/herself using an access-control list (ACL).

The access-control list is managed for each user, is generated by copying the one prepared by the messaging server 100 as a default when a user is registered in the messaging server 100, and is changed as necessary thereafter. Moreover, the user can use UI on the device 300 to explicitly change the access-control list.

The access-control list is stored as a part of user information on the messaging server 100, as described above. In addition, the access-control list is distributed via the communication processing unit 141 on the messaging server 100 and the server communication unit 301 on the device 300, and is stored in the access-control information managing unit 304 of the device 300.

When receiving a message from another device 300 or the messaging server 100, the routing unit 303 on the device 300 uses an access-control list on the access-control information managing unit 304 to determine whether the message can be accepted or not. A message that cannot be accepted is destroyed after a response of that fact is returned if possible.

In this embodiment, because data in the format of stream such as moving images at application levels is divided into messages (packets) and the messages are treated in the communication layer, the device 300 can perform access control on all communication with this mechanism.

FIG. 25 is a diagram showing an example of an entry format of an access-control list that is prepared as a default in the above-mentioned messaging server 100.

As shown in the figure, the entry format includes items of a source user ID, a source node ID, a source application ID, a destination user ID, a destination node ID, a destination application ID, a service name, and an access acceptance/rejection flag.

Here, the node ID is a device ID or server ID (ID of the messaging server 100).

The above-mentioned group ID may be described as a user ID or a node ID. In this case, an ID that matches any one of the user ID and device ID corresponding to the group ID is regarded as being matched with the group ID.

The service name represents not the network service 200 but a name of a function (service) provided by each device 300. For example, in the case where the service name is designated as "system.device.DeviceDiscovery," it refers to a device searching service provided by the device 300.

Out of the above-mentioned items, an item that does not cause a problem particularly even if it is not designated does not need to be designated.

FIG. 26 is a diagram showing an example of an access-control list generated in accordance with the above-mentioned entry format.

The access-control list is generated as a list of entries of an access-control list. In the example of the figure, the "system.device.DeviceDiscovery" service provided by the device 300 is accepted only by the device 300 having a source group ID of "Group123," and the access by other devices 300 are denied.

FIG. 27 is a diagram showing an example of header information of a message transmitted from another device 300 or the messaging server 100. In the example of the figure, if the source user ID "UserID432" or the source node ID "DevID321" matches a group ID on the above-mentioned access-control list or a user ID or device ID corresponding to the group ID, access to the above-mentioned service is accepted.

Figure 28:
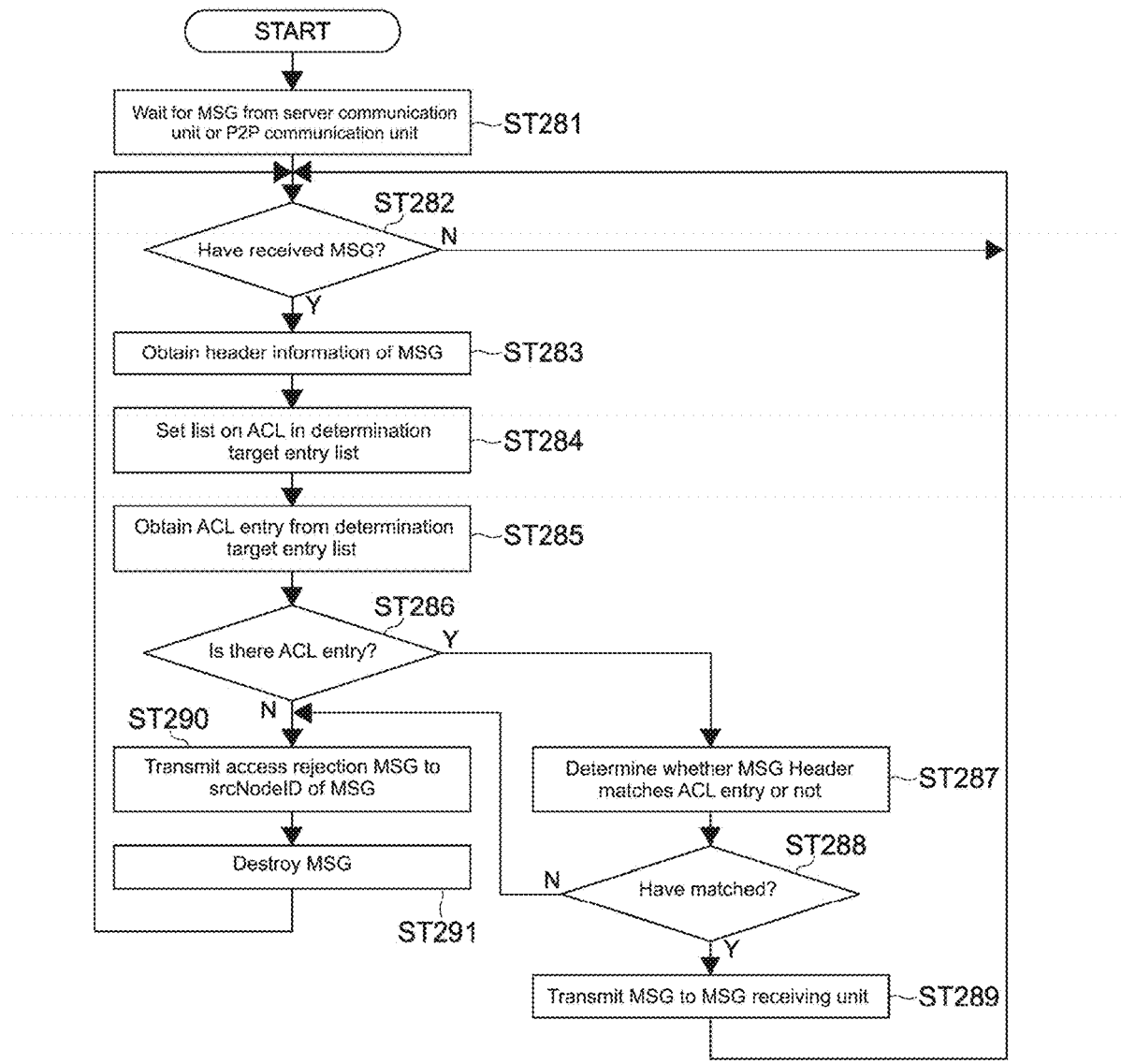
FIG. 28 A flowchart showing a flow of the access-control process by the device.

FIG. 28 is a flowchart showing a flow of an access-control process by the device 300.

As shown in the figure, the routing unit 303 of the device 300 waits for a message from the server communication unit 301 or the P2P communication unit 302 (Step 281).

In the case where it is determined that a message is received from the server communication unit 301 or the P2P communication unit 302 (Yes in Step 282), the routing unit 303 obtains header information of the message (Step 283).

Next, the routing unit 303 sets, in an entry list for determining acceptance/rejection of access, a list on the access-control list stored in the above-mentioned access-control information managing unit 304 (Step 284).

Next, the routing unit 303 obtains an entry of an access-control list from the determination target entry list (Step 285).

In the case where an entry can be obtained (Yes in Step 286), the routing unit 303 determines whether the above-mentioned header information of the message matches the above-mentioned obtained entry or not (Step 287).

Here, in the case where the entry is a group ID, the routing unit 303 regards the header information as being matched with a group ID if it matches any one of a user ID and device ID corresponding thereto.

In the case where it is determined that the above-mentioned header information matches the entry of the access-control list (Yes), the routing unit 303 transmits the above-mentioned message to the message receiving unit 307 (Step 289).

On the other hand, in the case where it is determined that there is no entry in the above-mentioned Step 286 (No) and that the above-mentioned header information does not match an entry in the above-mentioned Step 287 (No), the routing unit 303 transmits an access rejecting message to the source node ID of the above-mentioned message (Step 290).

Then, the routing unit 303 destroys the message (Step 291).

((Use for Distributing Message))

The device 300 can also transmit a message using the above-mentioned group ID, thereby transmitting the message to all the devices 300 on the partial network once.

Specifically, the device 300 designates the above-mentioned group ID as a destination user ID or destination node ID in the header of a message to be transmitted. When receiving the message, the messaging server 100 transfers it to all the devices 300 related to the group ID.

Accordingly, the device 300 can transmit a message once to the communication relaying unit 122 of the messaging server 100, thereby transmitting the message to a plurality of devices 300 on the partial network.

Figures 29, 30:
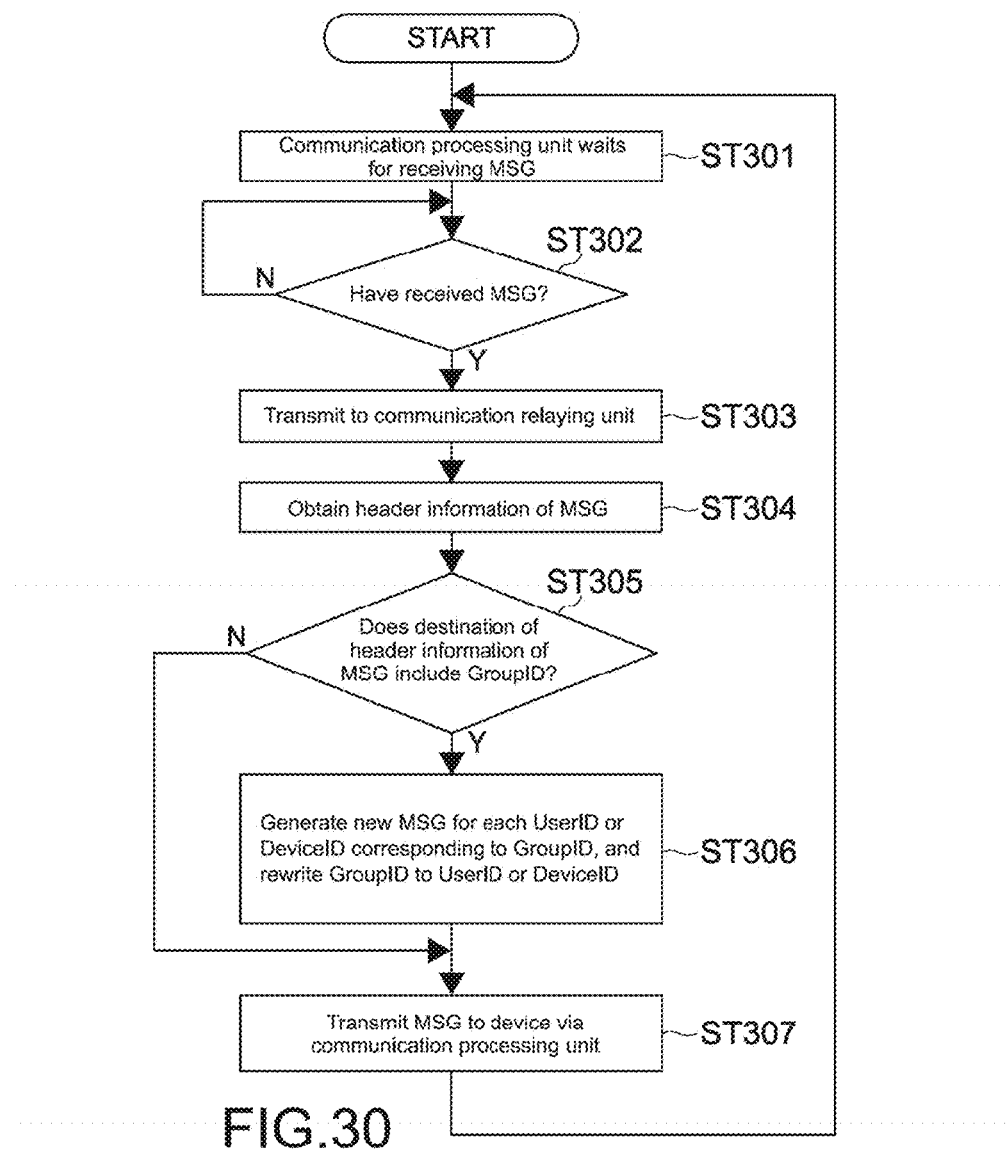
FIG. 29 A diagram showing an example of header information of a message when a device transmits the message that designates a group ID as a destination.
FIG. 30 A flowchart showing a flow of a message transferring process by the messaging server.

FIG. 29 is a diagram showing an example of header information of a message transmitted at this time. As shown in the figure, "GroupID232" is designated as a destination node ID.

FIG. 30 is a flowchart showing a flow of a message transferring process by the messaging server 100 that has received a message designating above-mentioned group ID.

As shown in the figure, the communication processing unit 141 of the messaging server 100 waits for receiving a message from the above-mentioned device 300 (Step 301).

When receiving a message (Yes in Step 302), the communication processing unit 141 transmits the message to the communication relaying unit 122 (Step 303).

The communication relaying unit 122 obtains header information of the above-mentioned message (Step 304).

Next, the communication relaying unit 122 determines whether a destination of the header information of the message includes a group ID or not (Step 305).

In the case where it is determined that the destination of the header information includes a group ID (Yes), the communication relaying unit 122 generates a new message for each user ID or device ID corresponding to the group ID, and rewrites the group ID in the header information of the message to the user ID or device ID (Step 306).

Then, the communication relaying unit 122 transmits the plurality of generated new messages or the message including no group ID as a destination to the device 300 via the communication processing unit 141 (Step 307).

((Use for Distributing Event Information))

The device 300 can also distribute, between the devices 300 in the partial network generated based on the above-mentioned social graph information, event information for mutually notifying the activation state of the device 300 or operation state of the application in the device 300.

The communication process for event distribution may use the above-mentioned message distributing mechanism as it is.

Examples of the above-mentioned event related to the operation state of the application includes:
start of viewing a TV program (program information);
start of recording a TV program (program information);
recording reservation of a TV program (program information);
change of a channel of a TV
change of temperature setting in an air conditioner;
start of streaming viewing of Internet video; and purchase of goods by mail order on the Internet.

When detecting such an event of itself, the device 300 generates a message for notifying the generation of the event and information related thereto (program/content information, setting value, etc.). Then, the device 300 designates the above-mentioned group ID as the destination user ID or destination node ID in the header of the message, and transmits it to the messaging server 100. The messaging server 100 converts the destination of the message into a user ID or device ID corresponding to the group ID, and transfers it to each device 300 that belongs to the partial network.

In this case, the messaging server 100 may allow the message to include a script that cause the similar event as the event generated in a certain device 300 to be generated also in another device 300 in the partial network. Alternatively, the message does not necessarily include such a script, and the device 300 may cause the similar event as that described above to be generated in itself based on the received message.

By using such an event distributing mechanism, the following matters can be achieved.

In the case where a certain user of the device 300 of the user in the partial network starts to view a TV program, an event related to viewing of the program is notified to the device 300 of a friend of the user, the friend knows what TV program his/her friend is viewing.

In the case where recording reservation of a program is input in the device 300 (recorder) of a certain user in the partial network, the recording reservation inputting event is notified to the device 300 of a friend of the user, and a recording reservation event is generated also in the device 300 of the friend automatically or by the friend's selection.

Figure 31:
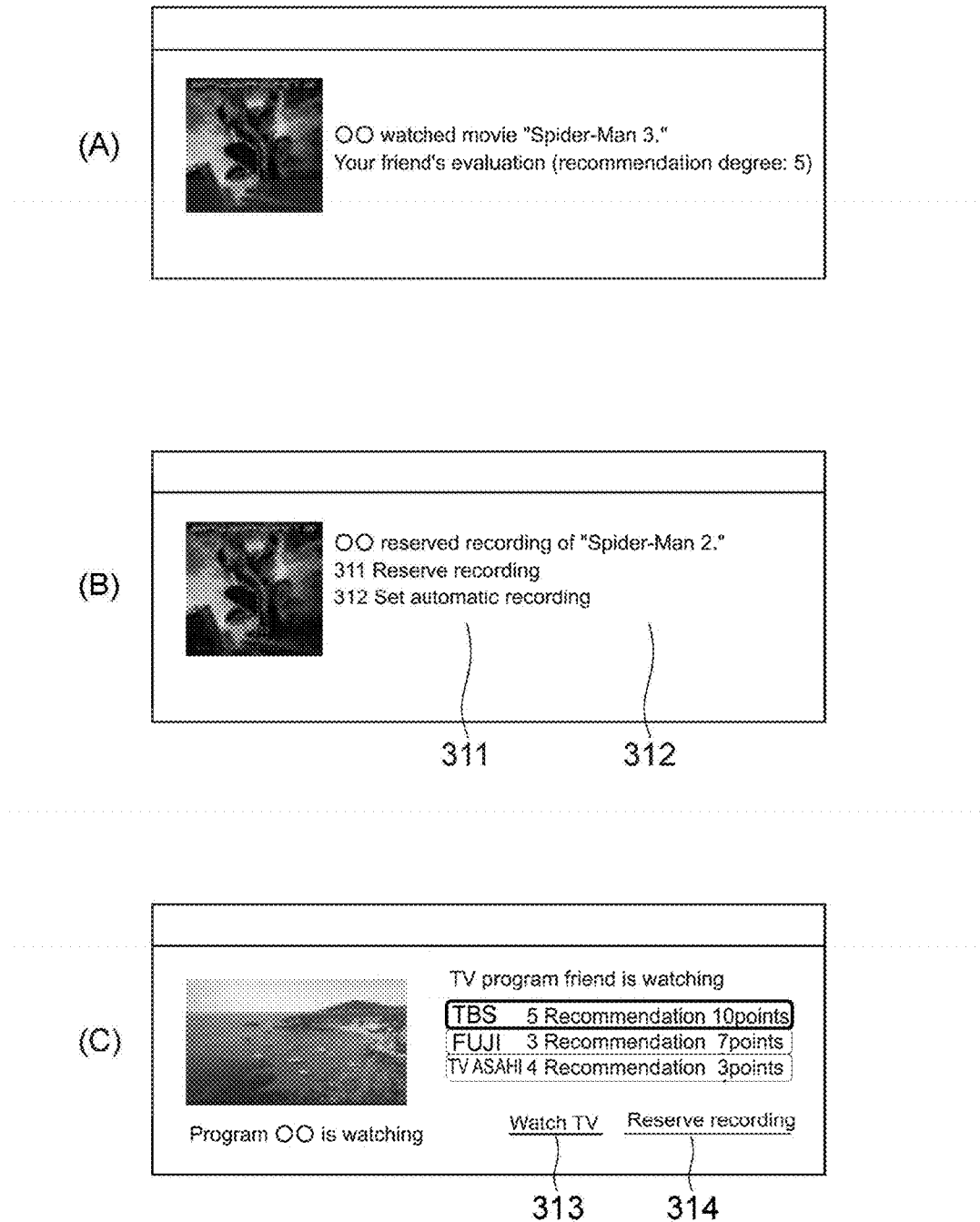
FIG. 31 A diagram showing an example of event information that is displayed in a device on the partial network.

FIG. 31 is a diagram showing an example of event information that is notified on the partial network, and is displayed in the device 300 of the destination.

The figure (A) is a diagram showing an example of a screen displayed in the device 300 being a destination by the event distributing mechanism when a movie is viewed via a TV program, an optical disc, or streaming in a certain device 300 in the partial network.

As shown in the figure, on the screen, a fact that the user being a message distribution source has viewed the movie is displayed together with the title, recommendation degree (evaluation by the user), the thumbnail, and the like of the viewed movie.

The figure (B) is a diagram showing an example of a screen displayed on the device 300 being a destination by the event distributing mechanism when recording reservation for a TV program (movie) is set in a certain device 300 in the partial network.

As shown in the figure, on the screen, a fact that the user being a message distributing source has reserved recording of the movie is displayed together with the title, thumbnail, and the like of the movie. In addition, on the screen, a button 311 for reserving recording of the movie also in the device 300 being a message distributing destination, a button 312 for selecting whether automatic recording reservation is set or not by the message distributing mechanism in the case where there is the similar notification, and the like are displayed.

Moreover, the messaging server 100 can monitor an event of the device 300 in the partial network, generate a new message including events in a plurality of devices 300, and transmit it as well as simply transfers a message from the device 300 in the partial network.

For example, the messaging server 100 may generate a new message that notifies a list of TV programs viewed in the devices 300 in the partial network at present based on a notification message of changing the viewing channel of TV from the devices 300 in the partial network and distribute it.

The figure (C) is a diagram showing an example of a screen displayed in the device 300 being a message distributing destination in this case.

As shown in the figure, on the screen, lists of the channel name viewed in each device 300 in the partial network, the number of viewers, and the recommendation degrees, the thumbnail of the video of the channel viewed in a device 300 out of the devices 300, and the like are displayed. In addition, on the screen, one channel can be selected from the list by moving cursor, for example, and a button 313 for viewing the program of the selected channel in the device 300 being a message distributing destination and a button 314 for recording reservation are displayed.

((Use for Distributing Presence Information))

The above-mentioned event distributing mechanism can be used also as a distributing mechanism for presence information of a user of the device 300 in the partial network.

Here, the presence information is information representing the state of a user of the device 300. Examples of the present information are as follows:
success of user authentication;
logout of a user;
suspension of a device; and
elapse of a predetermined time period without a user's operation.

The messaging server 100 monitors the above-mentioned presence in the partial network, generates a message notifying presence information at a predetermined period of time or every time the device 300 in the partial network makes an inquiry, and distributes it. The message includes a user ID or device ID and presence information of the device 300 corresponding thereto.

The device 300 that has received the event notification can combine image data (photograph) corresponding to each user ID or device ID that belongs to the partial network with the content of the message to display the presence information of the user of each device 300.

((Use for Multicast/Streaming Distribution))

Figure 32:
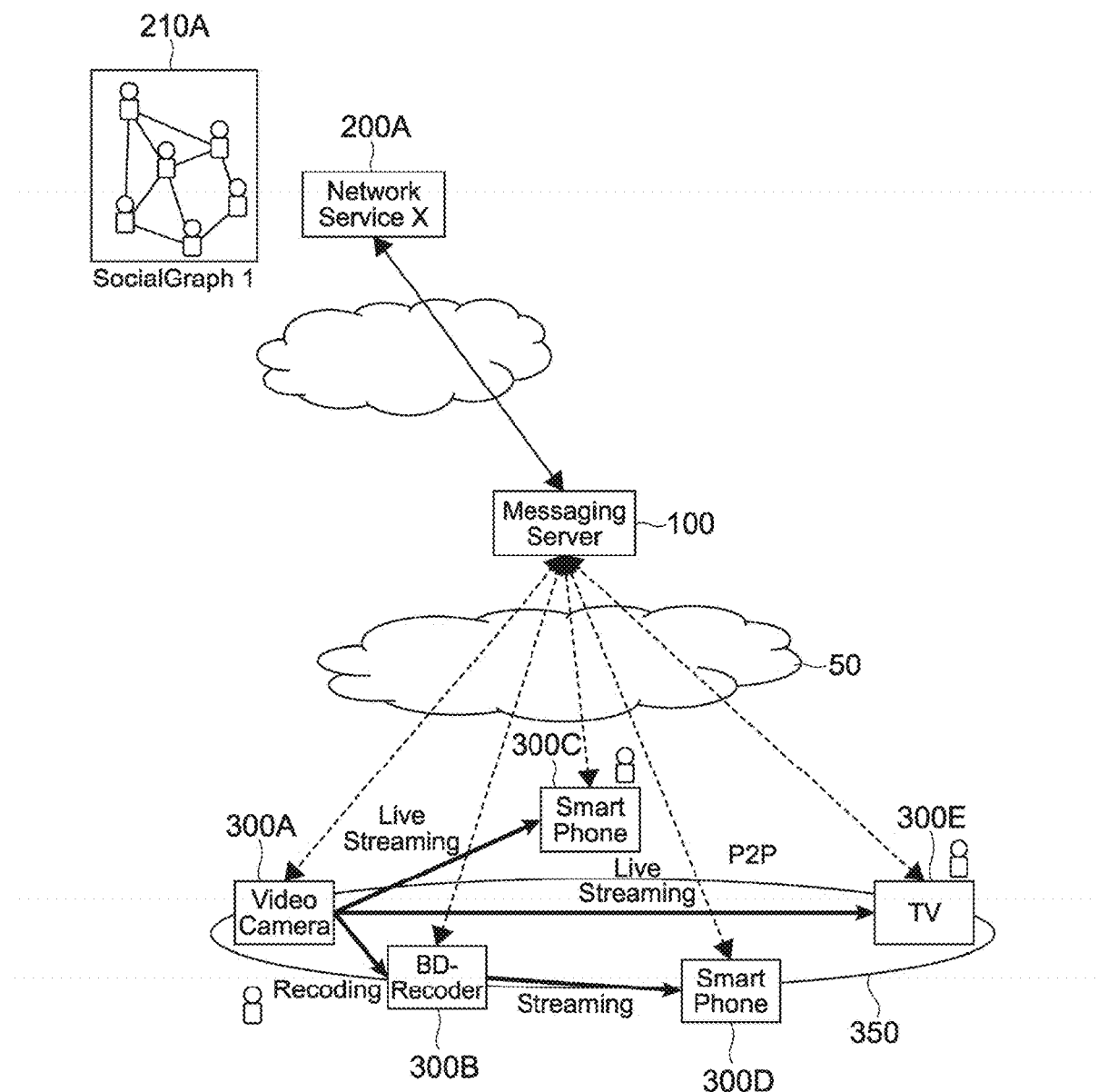
FIG. 32 A diagram showing an overview of a streaming process between devices on the partial network.

In the above-mentioned partial network, each device 300 can perform multicast communication and streaming communication with another device 300 via the P2P communication unit 302. FIG. 32 is a diagram showing an overview of the multicast communication or streaming communication.

As shown in the figure, in the partial network 350, the device 300A (video camera) instructs another device 300B (BD recorder) to record the movie that itself takes. Moreover, the device 300A performs live streaming distribution, to another device 300C (smartphone) and device 300E (TV), on the movie that itself takes by multicasting.

Moreover, the device 300B (recorder) that has recorded a movie can perform streaming distribution on the movie to another device 300D (smartphone) after the recording.

With such a mechanism, it is possible to perform multicast distribution on video taken at children's athletic contest to the devices 300 of a group consisting of users who belong to a elementary school parent community, or perform live streaming distribution while taking a movie, for example.

CONCLUSION

As described above, according to this embodiment, the messaging server 100 can generate group information on a group consisting of a plurality of users having a relationship based on social graph information on the network service 200, and generate a partial network including the plurality of devices 300 of users who belong to the group. Accordingly, users having a relationship can easily use their devices 300 mutually and in cooperation with each other.

Modified Example

The present technology is not limited only to the above-mentioned embodiment and various modifications can be made without departing from the gist of the present technology.

In the above-mentioned embodiment, in the user authentication process, although, by performing a user authentication process on all devices 300 held by one user, the devices 300 are associated with the user, the association may be performed by another means. For example, in the case where an authentication process is performed on one device 300 with the above-mentioned user ID and password, an association setting request is transmitted from the authenticated device 300 to a different device 300 being an association target. In the case where an operation that permits the request on the different device 300 is performed, the permission information is transmitted to the messaging server 100, whereby the different device 300 is added to the above-mentioned device list. Accordingly, even in the case where the different device 300 includes no input device for inputting a user ID and password or output device for outputting UI therefor, it is possible to associate the user with the device 300.

In the above-mentioned embodiment, in the group information generating process, the group information generating information has been described as static information as shown in FIG. 19 and FIG. 20. However, the group information generating information may be simply expressed as a script with a programming language or the like. Moreover, the individual group information generating information needs not to be managed independently, and may be built in the messaging server 100 as a process by the group information generating unit 113

In the above-mentioned message distributing process in the partial network, in the communication relaying unit 122, the messaging server 100 converts a message that designates a group ID into a plurality of messages and then distributes them. However, this process may be performed in the message transmitting unit 306 of the device 300. In this case, P2P communication is used for actual communication. With such a process, the burden on the messaging server 100 is reduced.

In the above-mentioned embodiment, in the access-control process from the device 300, a message that designates no group ID has been rejected uniformly. However, the access control may be performed not only with a group ID but also with the number of hops. For example, a group may be generated based on users with the number of hops being up to 2, and only users with the number of hops being 1 may be permitted to access a specific service. In this case, an item related to the number of hops is added to an entry format or header information of an access-control list.

Moreover, similarly, also in the message distributing process using a partial network in the above-mentioned embodiment, a message does not necessarily need to be distributed to all the devices 300 in the partial network, and the destination may be limited based on the number of hops. Also in this case, the number of hops is designated in header information of the message.

In the above-mentioned embodiment, an example in which a movie is distributed between the devices 300 in the partial network by multicast and streaming has been described. However, of course, data to be multicast or streamed is not limited to a movie, and may be other data such as audio and text. Moreover, between the devices 300 in the partial network, a chat function using a movie, audio, or text may be provided.

Furthermore, in this case, by combining the chat function with the above-mentioned event information distributing mechanism, in the case where a group consists of a community related to a specific artist, for example, users in the group can have some chat while viewing a program on which the specific artist appears.

[Others]

The present technology may also take the following configurations.

(1) An information processing apparatus, including:
   a communication unit capable of communicating with a service on a network in which a plurality of users are capable of participating and devices of the plurality of the users;
   a storage unit capable of storing user information on the plurality of users and device information on the devices of the plurality of users in relation to each other; and
   a controller capable of
      controlling the communication unit so that the communication obtains, from the service, social graph information representing a relationship between the plurality of users,
      generating group information on a group consisting of a plurality of users having the relationship based on the obtained social graph information,
      generating a partial network including devices of users in the group based on the generated group information, the stored user information, and the stored device information, and
      controlling the communication unit so that the communication unit controls communication between the devices in the generated partial network.

(2) The information processing apparatus according to (1) above, in which
   the controller controls the communication unit so that the communication unit notifies the devices in the partial network of that the partial network has been generated.

(3) The information processing apparatus according to (1) or (2) above, in which
   the controller controls the communication unit so that the communication unit transmits, to the devices in the partial network, an access-control list for rejecting access from a device of a user who does not belong to the group, based on the group information.

(4) The information processing apparatus according to (3) above, in which
   the controller causes the access-control list to include a group ID for identifying the group, and controls the devices in the partial network so that the devices in the partial network reject access from a device that does not designate the group ID.

(5) The information processing apparatus according to any one of (1) to (4) above, in which
   the controller controls the communication unit so that the communication unit receives, from a device in the partial network, a message that designates the group ID for identifying the group as a destination, and transfers the message to all devices in the partial network that are associated with the group ID.

(6) The information processing apparatus according to any one of (1) to (5), in which
   the controller
   detects generation of a predetermined event related to the device in the partial network, and
   controls, in the case where the generation of the event is detected, the communication unit so that the communication unit transmits event information on the event to all devices in the partial network.

(7) The information processing apparatus according to (6) above, in which
   the controller causes the event information to include a massage that is able to perform control so that an event generated in a device in the partial network is generated also in another device in the partial network.

(8) The information processing apparatus according to (6) or (7), in which
   the controller
   obtains presence information on the device on the partial network, and
   controls the communication unit so that the communication unit transmits the obtained presence information to the device in the partial network.

(9) The information processing apparatus according to any one of (1) to (8), in which
   the controller
   controls the communication unit so that the communication unit receives, from a device of a user in the group, a request for generating the partial network, and
   generates the partial network in response to the request.

(10) The information processing apparatus according to any one of (1) to (9), in which
   the controller
   controls the communication unit so that the communication unit obtains the social graph information again based on a request from a device in the partial network or periodically, and
   updates the group information based on the social graph that is obtained again.

(11) The information processing apparatus according to any one of (1) to (10), in which
   the device information includes a device list for each user, and
   the controller
   controls the communication unit so that the communication unit receives a request for updating the device list from a device in the partial network, and
   updates the device list based on the request.

(12) The information processing apparatus according to any one of (1) to (11), in which
   the service manages a first user ID for a device of the user to log in the service, and
   the controller controls the storage unit so that the storage unit stores a second user ID for the device of the user to log in the information processing apparatus in relation to the first user ID.

DESCRIPTION OF REFERENCE NUMERALS 11, 31 CPU
13, 33 RAM
16, 36 display unit
17, 37 operation receiving unit
18, 38 storage unit
19, 39 communication unit
50 WAN
100 messaging server
111 service authentication unit
112 social graph information obtaining unit
113 group information generating unit
121 partial network managing unit
122 communication relaying unit
132 user information managing unit
141 communicating processing unit
200 network service
210 social graph information
300 (300A to 300F) device
301 server communication unit
302 P2P communication unit
303 routing unit
304 access-control information managing unit
305 partial network information managing unit
306 message transmitting unit
307 message receiving unit
350 (350A, 350B) partial network

The invention claimed is:

1. An information processing apparatus, comprising:
a memory configured to store user information associated with a plurality of users in relation with device information associated with devices of the plurality of users, wherein the plurality of users are capable to participate in a network; and
a central processing unit (CPU) configured to:
control communication to obtain, from a service on the network, social graph information representing a relationship between the plurality of users;
generate group information associated with a group, wherein the group includes the plurality of users having the relationship based on the obtained social graph information;
generate a partial network including the devices of each of the plurality of users in the group based on the generated group information, the stored user information, and the stored device information;
control communication between the devices in the generated partial network by transmission of, to the devices in the partial network, an access-control list which includes a first group ID to identify the group;
detect generation of a determined event in a first device of the devices in the partial network; and
control, based on a detection of the generation of the determined event, communication to transmit event information associated with the determined event to all the devices in the partial network.

2. The information processing apparatus according to claim 1, wherein the CPU is further configured to control communication to notify the devices in the partial network that the partial network is generated.

3. The information processing apparatus according to claim 1, wherein the CPU is further configured to:
control communication to receive, from the first device, a message that designates the first group ID to identify the group as a destination; and
transfer the message to devices in the partial network that are associated with the first group ID.

4. The information processing apparatus according to claim 1, wherein the CPU is further configured to include a message in the event information, wherein the determined event generated in the first device is generated in a second device in the partial network based on the message.

5. The information processing apparatus according to claim 1, wherein the CPU is further configured to:
obtain presence information associated with the first device; and
control communication to transmit the obtained presence information to the first device.

6. The information processing apparatus according to claim 1, wherein the CPU is further configured to:
control communication to receive, from a second device of a first user of the plurality of users in the group, a request to generate the partial network; and
generate the partial network based on the request.

7. The information processing apparatus according to claim 1, wherein the CPU is further configured to:
control communication to obtain the social graph information based on a request from the first device; and
update the group information based on the social graph information that is obtained based on the request from the first device.

8. The information processing apparatus according to claim 1, wherein
the device information includes a device list for each user of the plurality of users, and
the CPU is further configured to:
control communication to receive a request from the first device to update the device list; and
update the device list based on the request.

9. The information processing apparatus according to claim 1, wherein
the service manages a first user ID for a second device, of a first user of the plurality of users, to log in the service, and
the CPU is further configured to control the memory such that the memory stores a second user ID for the second device of the first user, to log in the information processing apparatus, in relation to the first user ID.

10. The information processing apparatus according to claim 1, wherein the CPU is further configured to control the devices in the partial network such that the devices in the partial network reject access from a second device with a second group ID that is different from the first group ID.

11. The information processing apparatus according to claim 1, wherein the CPU is further configured to:
control communication to obtain the social graph information periodically; and
update the group information based on the social graph information that is obtained periodically.

12. An information processing system, comprising:
an information processing apparatus; and
a first device of a first user, the information processing apparatus including:
a memory configured to store user information associated with a plurality of users in relation with device information associated with devices of the plurality of users, wherein the plurality of users are capable to participate in a network; and
a central processing unit (CPU) configured to:
control communication to obtain, from a service on the network, social graph information representing a relationship between the plurality of users;

generate group information associated with a group, wherein the group includes the plurality of users having the relationship based on the obtained social graph information; and generate a partial network including the devices of each of the plurality of users in the group based on the generated group information, the stored user information, and the stored device information, the first device of the first user including:

a second CPU configured to control communication to transmit, to the devices in the partial network, an access-control list which includes a group ID to identify the group;

detect generation of a determined event in a second device of the devices in the partial network; and control, based on a detection of the generation of the determined event, communication to transmit event information associated with the determined event to all the devices in the partial network.

13. An information processing method, comprising:

storing user information associated with a plurality of users in relation with device information associated with devices of the plurality of users;

obtaining, from a service on a network in which the plurality of users are capable of participating, social graph information representing a relationship between the plurality of users;

generating group information associated with a group, wherein the group includes the plurality of users having the relationship based on the obtained social graph information;

generating a partial network including the devices of each of the plurality of users in the group based on the generated group information, the stored user information, and the stored device information;

controlling communication between the devices in the generated partial network by transmitting, to the devices in the partial network, an access-control list which includes a group ID for identifying the group;

detecting generation of a determined event in a first device of the devices in the partial network; and controlling, based on a detection of the generation of the determined event, communication to transmit event information associated with the determined event to all the devices in the partial network.

14. A non-transitory computer-readable medium having stored thereon computer-executable instructions, for causing an information processing apparatus to execute operations, the operations comprising:

storing user information associated with a plurality of users in relation with device information associated with devices of the plurality of users;

obtaining, from a service on a network in which the plurality of users are capable of participating, social graph information representing a relationship between the plurality of users;

generating group information associated with a group, wherein the group includes the plurality of users having the relationship based on the obtained social graph information;

generating a partial network including the devices of each of the plurality of users in the group based on the generated group information, the stored user information, and the stored device information;

controlling communication between the devices in the generated partial network by transmitting, to the devices in the partial network, an access-control list which includes a group ID for identifying the group;

detecting generation of a determined event in a first device of the devices in the partial network; and controlling, based on a detection of the generation of the determined event, communication to transmit event information associated with the determined event to all the devices in the partial network.

* * * * *